(12) United States Patent
Stridsberg

(10) Patent No.: US 7,098,619 B2
(45) Date of Patent: Aug. 29, 2006

(54) ACTUATOR AND MOVEMENT LINKAGE SYSTEM

(75) Inventor: Lennart Stridsberg, Stockholm (SE)

(73) Assignee: Stridsberg Innovation AB, Stockholm (SE)

( * ) Notice: Subject to any disclaimer, the term of this patent is extended or adjusted under 35 U.S.C. 154(b) by 0 days.

(21) Appl. No.: 11/043,973

(22) Filed: Jan. 28, 2005

(65) Prior Publication Data

US 2006/0006824 A1    Jan. 12, 2006

(30) Foreign Application Priority Data

| Jan. 28, 2004 | (SE) | 0400194 |
|---|---|---|
| Feb. 10, 2004 | (SE) | 0400293 |
| Feb. 15, 2004 | (SE) | 0400345 |
| Mar. 4, 2004 | (SE) | 0400533 |
| Mar. 16, 2004 | (SE) | 0400653 |
| May 9, 2004 | (SE) | 0401213 |
| Jun. 1, 2004 | (SE) | 0401403 |
| Sep. 26, 2004 | (SE) | 0402311 |
| Sep. 29, 2004 | (SE) | 0402368 |

(51) Int. Cl.
  *G05B 9/03*    (2006.01)
  *B64C 5/00*    (2006.01)

(52) U.S. Cl. ............ 318/563; 307/86; 244/34 R; 244/195

(58) Field of Classification Search ........ 318/563–566; 307/80, 85–87; 244/76 R, 194–195, 226–231, 244/34 R
See application file for complete search history.

(56) References Cited

U.S. PATENT DOCUMENTS

| 4,130,241 A * | 12/1978 | Meredith et al. ............. 714/10 |
|---|---|---|
| 4,179,944 A | 12/1979 | Conner |
| 4,530,271 A | 7/1985 | Cronin |
| 4,575,027 A | 3/1986 | Cronin |
| 4,649,484 A * | 3/1987 | Herzog et al. ................. 701/3 |
| 4,858,491 A | 8/1989 | Shube |
| 4,887,214 A * | 12/1989 | Takats et al. ................... 701/3 |
| 5,183,387 A * | 2/1993 | Huggett et al. ............. 416/147 |
| 5,670,856 A | 9/1997 | Le et al. |
| 5,806,805 A * | 9/1998 | Elbert et al. ................ 244/195 |
| 5,852,333 A * | 12/1998 | Strojny et al. ................ 307/87 |
| 6,208,923 B1 | 3/2001 | Hommel |
| 6,237,433 B1 | 5/2001 | Rodrigues |
| 6,402,259 B1 | 6/2002 | Corio et al. |
| 6,439,512 B1 * | 8/2002 | Hart ........................... 244/178 |
| 6,636,009 B1 * | 10/2003 | Walter ........................ 318/564 |
| 6,776,376 B1 | 8/2004 | Collins |
| 6,919,702 B1 * | 7/2005 | Szulyk ........................ 318/599 |
| 6,992,458 B1 * | 1/2006 | Hashimoto et al. .... 318/568.13 |

FOREIGN PATENT DOCUMENTS

WO    WO-2004/034550 A1    4/2004

* cited by examiner

*Primary Examiner*—Bentsu Ro
(74) *Attorney, Agent, or Firm*—Birch, Stewart, Kolasch & Birch, LLP

(57) ABSTRACT

An actuator and movement linkage system for moving a load, such as a control surface of aircraft, in relation to a carrying structure includes an electric motor system, an actuator device connectable or connected to the load to move the load, the actuator device connected to the electric motor system to be driven thereby, and transfer units provided for mechanically connecting the actuator device to move the load. Fault tolerant and release devices are provided both in the electrical motor system and in the actuator device to make the actuator and movement linkage system fault tolerant to at least single faults in the actuator and movement linkage system,

77 Claims, 18 Drawing Sheets

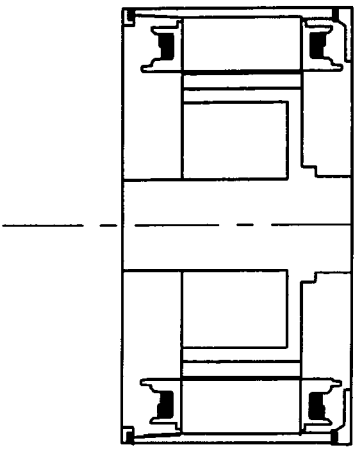
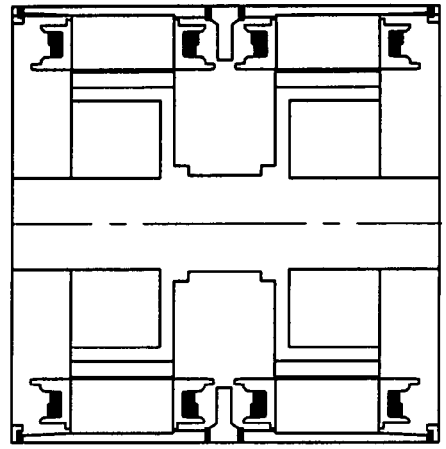
Fig. 7a
Prior art
Fig. 7b
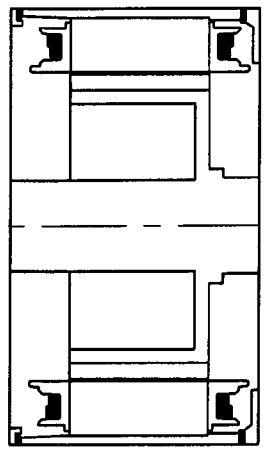
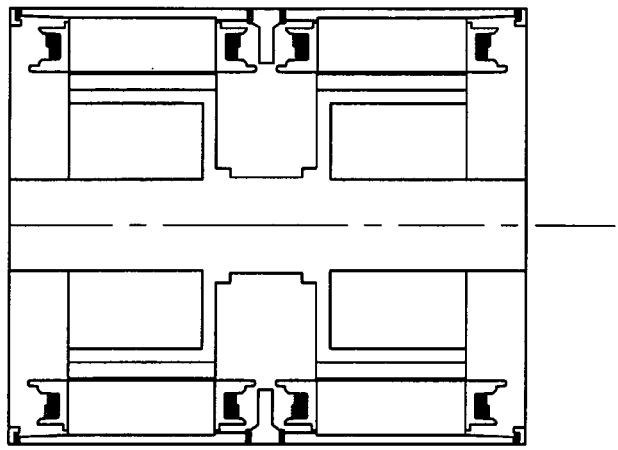
Fig. 8a
Prior art
Fig. 8b

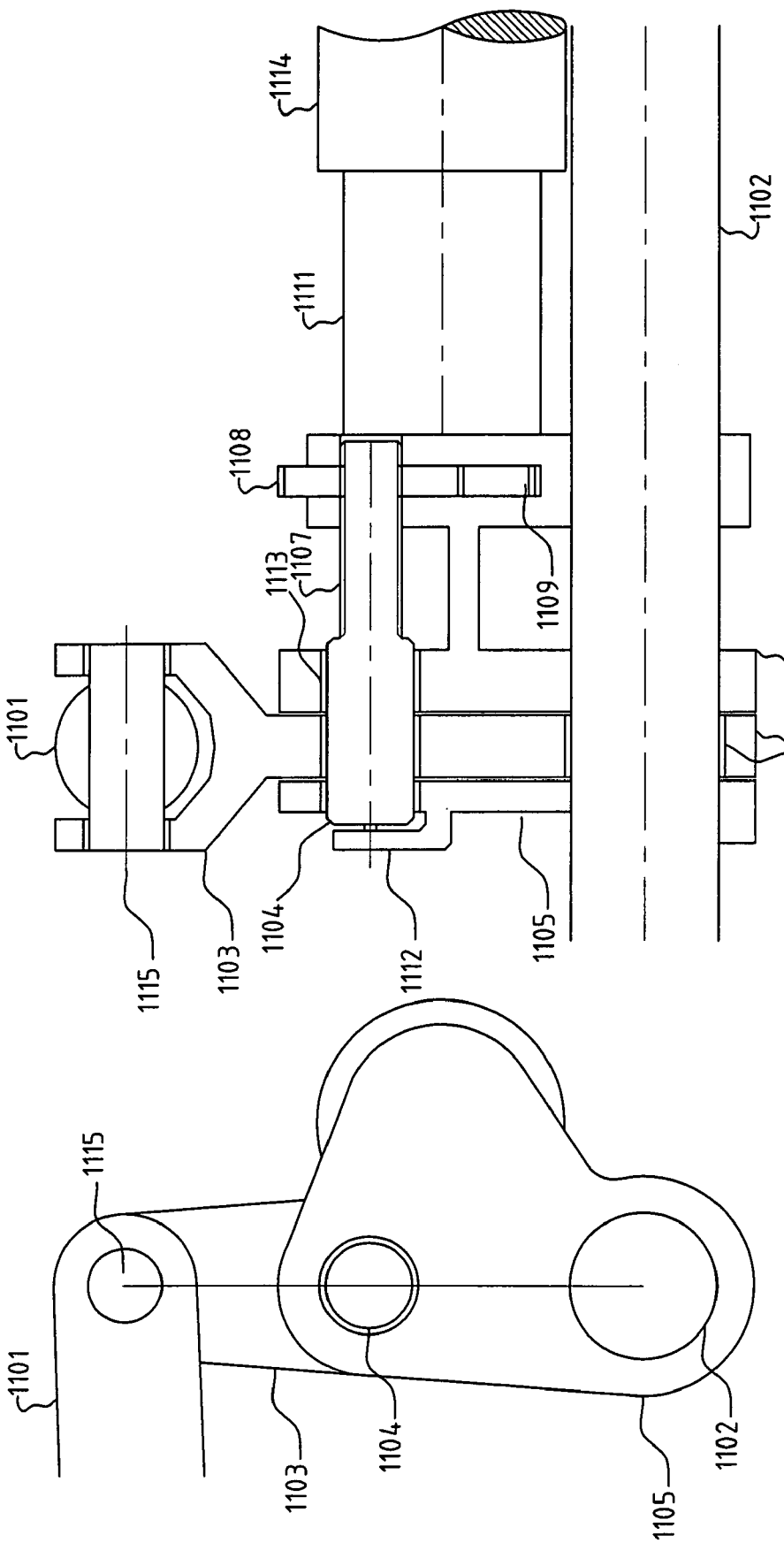

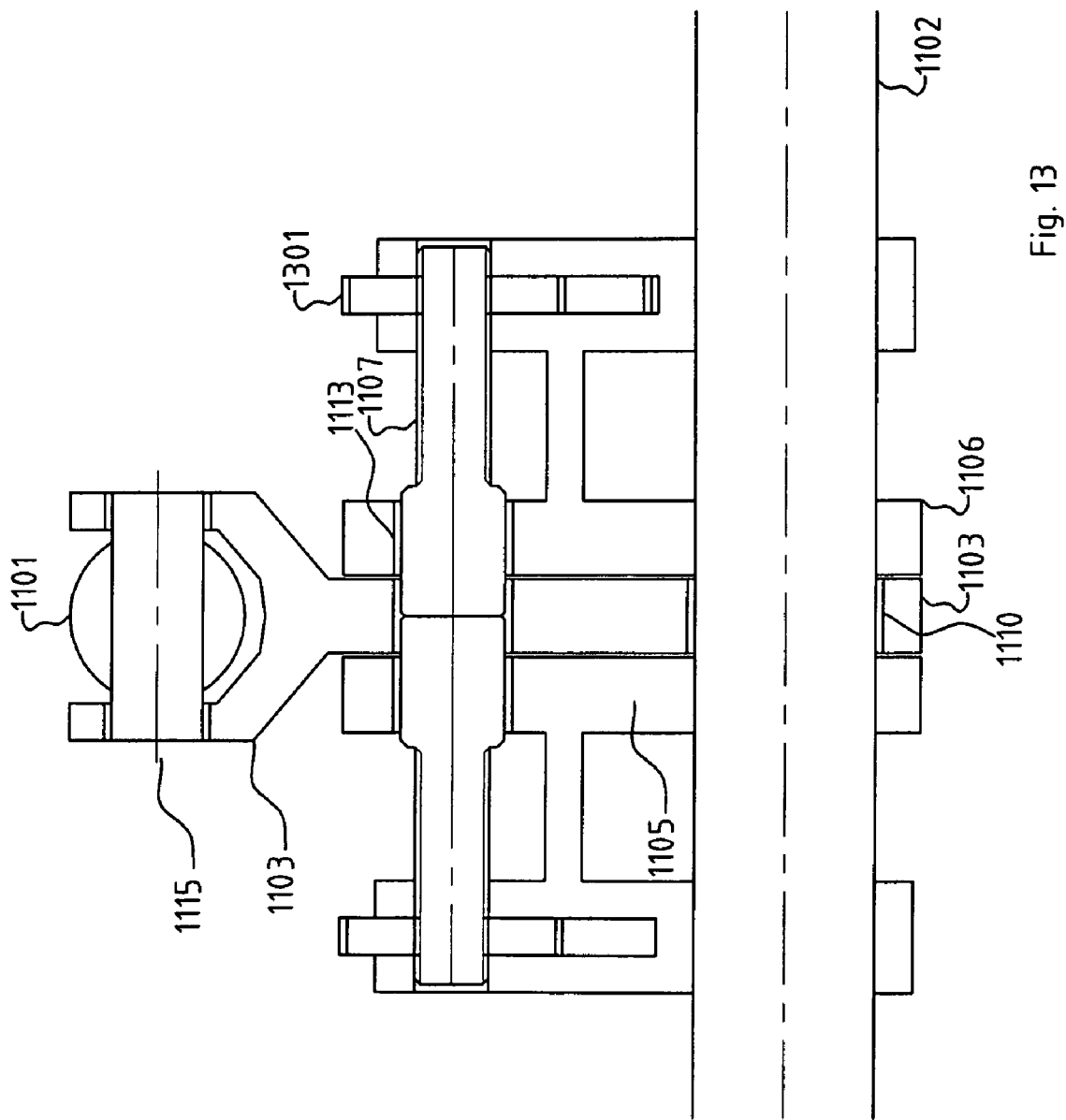

ACTUATOR AND MOVEMENT LINKAGE SYSTEM

RELATED APPLICATIONS

This application claims priority and benefit from Swedish patent application Nos. 0400194-7, filed Jan. 28, 2004, 0400293-7, filed Feb. 10, 2004, 0400345-5, filed Feb. 15, 2004, 0400533-6, filed Mar. 4, 2004, 0400653-2, filed Mar. 16, 2004, 0401213-4, filed May 9, 2004, 0401403-1, filed Jun. 1, 2004, 0402311-5, filed Sep. 26, 2004, 0402368-5, filed Sep. 29, 2004, the entire teachings of which are incorporated herein by reference.

TECHNICAL FIELD

The present invention is concerned with actuator and movement linkage systems such as high reliability actuators for control surfaces of aircraft and similar applications, in particular actuators including high reliability electric motor systems and/or including release devices, and is also concerned with such high reliability electric motor systems and release devices for use in other applications.

BACKGROUND AND PRIOR ART

There has for a long time been an interest to make "more electric aircraft" as electric actuators are assumed to permit a lower total mass, less frequent maintenance, easier connections, i.e. cables should be used in place of hydraulic tubes, and possibly the total elimination of the infrastructure required for hydraulics.

One problem identified with electromechanical actuators is the possibility of "jamming". An electromechanical actuator like that disclosed in the published International patent application No. WO 2004/034550 for Stridsberg Innovation AB/Lennart Stridsberg has a roller screw and nut and an electric motor connected to the roller nut. Certain types of catastrophic failures such as a broken roller nut roller may cause the roller screw to lock in the nut, making rotation impossible. If this happens to occur when the control surface is in an extreme position, the aircraft can become uncontrollable.

A related problem might occur if the electric motor would be completely disabled, i.e. incapable of creating torque but mechanically free to rotate. If this happens to occur when the control surface is in an extreme position, a large force will act on the roller screw. Roller screws are not self-retaining. Therefore, this force should translate into a torque acting on the roller nut to cause the roller nut and its associated motor to rotate, thereby moving the control surface towards a more neutral position. To ensure this, it is preferable to have a large lead angle roller screw as the efficiency from a linear motion of the screw to torque on the nut varies from some 0.9 on large lead angle screws to some 0.7 for fine lead angle screws. However, to reduce the mass of the electric motor acting on the roller nut, it is preferable to have a small lead angle roller screw.

Jamming is less likely to occur in a hydraulic actuator. If an actuator ceases to operate due to faults in pumps, valves or other energizing or control parts, a release valve can be opened that connects the two chambers on each side of the piston, thereby permitting oil to pass from one side to the other. However, hydraulic actuators may jam due to problems caused by deformations of the cylinder caused by enemy weapons or accidental collisions with external parts like the one that crashed a Concorde in Paris in July, 2000.

U.S. Pat. No. 6,208,923 for Hommel discloses a conventional fault-tolerant actuator control system having two parallel systems, each with a power supply, a process computer, motor power electronic circuits and a servo motor. The process computer in one of the parallel systems can only control the motor power electronic circuits in the same system, etc. The servo motors act on a common rack and there is one rack position sensor. One of the two systems are active and the other is shut down. The patented invention is to use the not active servo motor as an additional source of position information.

U.S. Pat. No. 5,670,856 for Le and Huggett discloses a fault tolerant system intended for aircraft control surfaces. The system has a common control computer, a common power supply and a common end actuator, for example a rack or a hydraulic cylinder, and three parallel systems each having one controller, one inverter (motor power electronic circuits), and one motor. The controller in one of the parallel systems can only control the motor power electronic circuits in the same system, etc. During a no fault condition, all three controllers, inverters and motors are active.

U.S. Pat. No. 6,402,259 for Corio discloses a wheel brake having redundant control and power supply. As shown in FIG. 6 of that patent, the system has three main power systems, two redundant BSCU computers that handle common tasks like anti-skidding control and four wheel brakes each including four servo motors. There are four redundant EMACs, each controlling two of four inner wheel servo motors and two of four outer wheel servo motors. As shown in FIG. 7, each EMAC contains four servo motor amplifiers, each of them connected to one motor that has an own tachometer, brake, gear train, actuator and position sensor. There is little risk of stability conflicts between the servo systems as the motors have no common mechanical stiff part. The closest mechanical connection is that their actuators press against the same brake disc.

U.S. Pat. No. 6,776,376 for Collins discloses an actuator system having two electro-mechanical actuators of equal size acting on a common control surface over a summing lever. The position of the control surface will be the average of the position of the two actuators. In the case where one actuator jams in for example a position 90% to the left, the control surface can be brought back to a neutral position by moving the other actuator to a position 90% to the right. The design will have the complexity of two actuators and a link arm. In case of jamming, the still operational actuator might be useless for any purpose but balancing the jammed actuator.

U.S. Pat. No. 6,237,433 for Rodrigues discloses an actuator having a roller nut that moves along an axially static roller screw. The roller nut is connected to an arm that is movable in parallel with the roller screw. A rather complex device including an extra motor, a gear box, a splined shaft longer that the total stroke of the actuator, an extra gear set, 18 rollers and a large diameter device similar to a roller nut permits the roller nut to be disconnected from the arm that is movable in parallel with the roller nut, thus permitting the control surface to move freely even if the roller nut/screw system has jammed. No damping system is disclosed.

U.S. Pat. No. 4,575,027 for Cronin discloses a rotational actuator that can rotate over a limited angle and that controls a control surface over a link arm. The stator of the actuator is assembled to the fuselage over bearings. A locking pin between the fuselage and the actuator stator will prevent the actuator stator to move relative to the fuselage. A solenoid can release the locking pin, thus permitting the control surface to move itself by turning the whole actuator. No damping system is disclosed.

U.S. Pat. No. 4,530,271 for Cronin discloses an actuator system including an electro-mechanical actuator connected to a control surface through a hydraulic device that basically is an electrohydraulic actuator without a pump. The intermediate device has the same stroke as the electromechanical actuator and transfers the same force as the electromechanical actuator. The arrangement is therefore almost as heavy as the combination of one electromechanical and one electrohydraulic actuator.

U.S. Pat. No. 4,179,944 for Conner discloses an actuator having two motors, one giving torque for ingoing and the other for outgoing movements. If the motors are commanded to give torque in the other direction, the motor rotors will slide along a tapped common shaft, approaching each other. This will release pins that normally connect the tapped shaft to a ball or roller nut. Release can be tested and then reversed. The design presupposes two actuators, one active and one passive, and therefore requires four motors for each controlled axis.

U.S. Pat. No. 4,858,491 discloses an actuator having two motors and a mechanical differentiating device that releases locking pins when the two motors move out of synchronization with each other.

SUMMARY

It is a general object of the invention to provide an actuator system in which the negative effects of the major fault types are reduced or eliminated, the fault types addressed being:

power source faults, short and open circuit failures in rail voltage capacitors, motor winding failures, such as short circuits in the stator system, inability to deliver required torque due to fault in power switches, unwanted braking torques that in prior art will be induced by the emf in a winding of a rotating electric motor if a power switch or a rail voltage system is short-circuited, faults in a motor control processor, conflicts that may appear when several motor control processors send commands to different parts of the same electric motor or to electric motors connected by stiff mechanic parts, faults caused by faulty motor control processors loading transducers and sensors, thus affecting the values read by operational motor control processors, and jamming in the movable mechanical parts of the actuator.

It is a particular object of the invention to provide a mechanism suitable to disconnect a control surface actuator in the case were one of several actuators acting on the same control surface is jammed.

It is another object of the invention to provide a mechanism suitable to disconnect a control surface actuator in the case were a single actuator for a control surface is jammed.

It is another object of the invention to provide a release mechanism that can disconnect a control surface actuator in the case where an actuator is locked and that can add a friction torque to dampen oscillations of the control surface.

It is another object of the invention to provide an actuator system that reduces the probability that an actuator will be jammed or locked in a position far from a neutral position due to loss of motor torque.

It is another object of the invention to provide an actuator architecture that reduces the probability that an actuator will lose its required performance due to loss of motor torque.

It is another object of the invention to provide an actuator architecture that reduces the requirements of time consuming maintenance activities.

It is another object of the invention to provide an actuator architecture that fulfills the above objects by using a low weight device.

It is another object of the invention to provide an actuator architecture that fulfills the above objects with a minimal risk of stability problems due to synchronization between different controllers.

It is another object of the invention to reduce the downtime by handling as many faults as possible in the electronic part.

Thus, generally a fault tolerant actuator and movement linkage system includes an actuator device having an electric motor system and a mechanical conversion system such as a roller nut and screw driven by the electric motor system. The electric motor system has several windings which are connected to power control units which control the current in the windings. Required currents etc. are calculated by motor control processors. The linkage system transfers the movement of the actuator to movements in the load. The fault tolerant actuator and movement linkage system is tolerant against most major single faults. In particular it is:

tolerant against power source fault by having at least two power sources and means to connect all power control units to an operational power source, tolerant against short circuit failures in rail voltage capacitors by having a plurality of rail voltage capacitors connected in series with each other, the capacitors rated to withstand the voltage appearing if one of the capacitors is short-circuited, tolerant against motor winding failures by having at least six motor stator windings or winding groups without any direct metallic contact between the windings or winding groups, tolerant against stator motor winding failures by having at least six motor stator windings or winding groups without any direct metallic contact between the windings or winding groups, tolerant against loss of generated torque by failures in power switches by having the power switches arranged in a plurality of power switch units connected to respective ones of the motor windings, tolerant against faults that in prior art systems create unintended braking torque caused by short-circuits in power switches or short-circuits over rail voltage systems by having extra switches that in case of such short-circuits can break the current loop that otherwise would have been created by a motor winding, power switch unit diodes and the aforementioned short-circuited device, tolerant against faults in motor control processors by having a plurality of motor control processors and means to force all power control units to accept commands from one and the same, not faulty, motor control processor, by eliminating possible conflicts, occurring in prior art systems, between motor control processors by having a plurality of motor control processors and means to force all power control units to accept commands from one and the same, not faulty, motor control processor, tolerant against jamming in the movable mechanical parts in the actuator device by having the transfer units joined by removable release devices that may disable the operation of the transfer units, thus permitting the load to be moved by a parallel actuator even when the actuator itself is jammed.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIGS. 7a and 7b are sectional views illustrating physical sizes of an electric motor as described herein and a dual electric motor according to prior art, the electric motors having the same power losses and mechanical output when operating at low average speeds, FIGS. 8a and 8b are sectional views similar to those of FIGS. 7a and 7b illustrating physical sizes of an electric motor as described herein and a dual electric motor according to prior art, the electric motors having the same power losses and mechanical output when operating at high average speeds, FIG. 11 is a view perpendicular to the control surface shaft of an actuator rod and release device, FIG. 12 is a view parallel to the control surface shaft of a release device, FIG. 13 is a view of a release system having two releasable half shafts with screw driven movement.

DETAILED DESCRIPTION

Figure 20A:
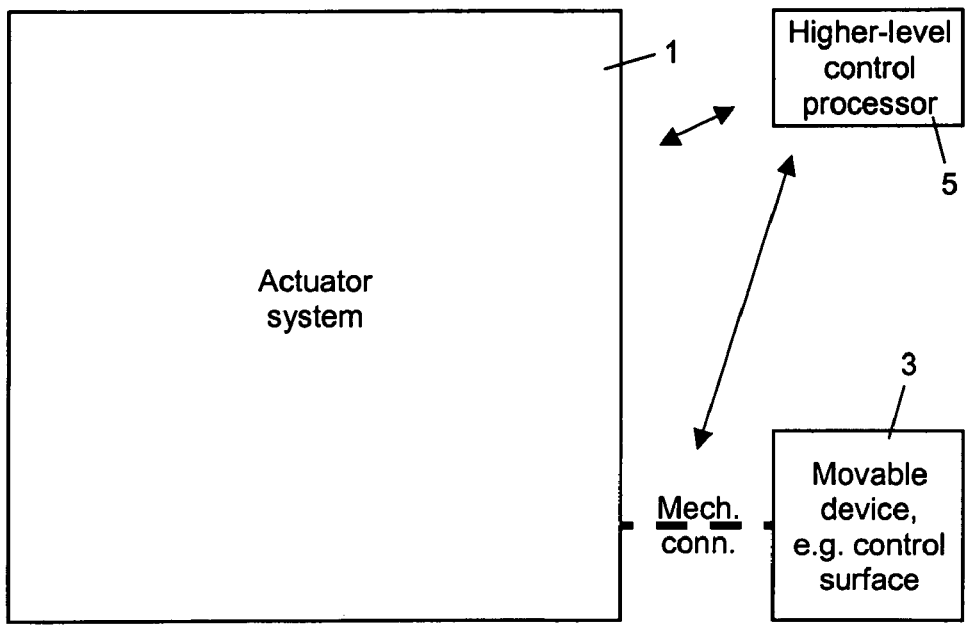
FIG. 20a is a schematic diagram of an actuator and movement linkage system according to prior art.

In FIG. 20a an actuator and movement linkage system according to prior art is schematically shown. It includes an actuator system 1 that is mechanically connected to a movable device 3. The actuator system and the mechanical connection are controlled by a higher-level control processor 5. Faults can appear both in the actuator system 1 and the mechanical connection. As seen in the schematic of FIG. 20b, fault tolerant and release devices are introduced in both the actuator system and in the mechanical connection, including fault tolerant and release devices 7 in the actuator system and a release device 9 in the mechanical connection, to eliminate, in the best possible way, the result of faults in the actuator system and the mechanical connection.

Figure 20B:
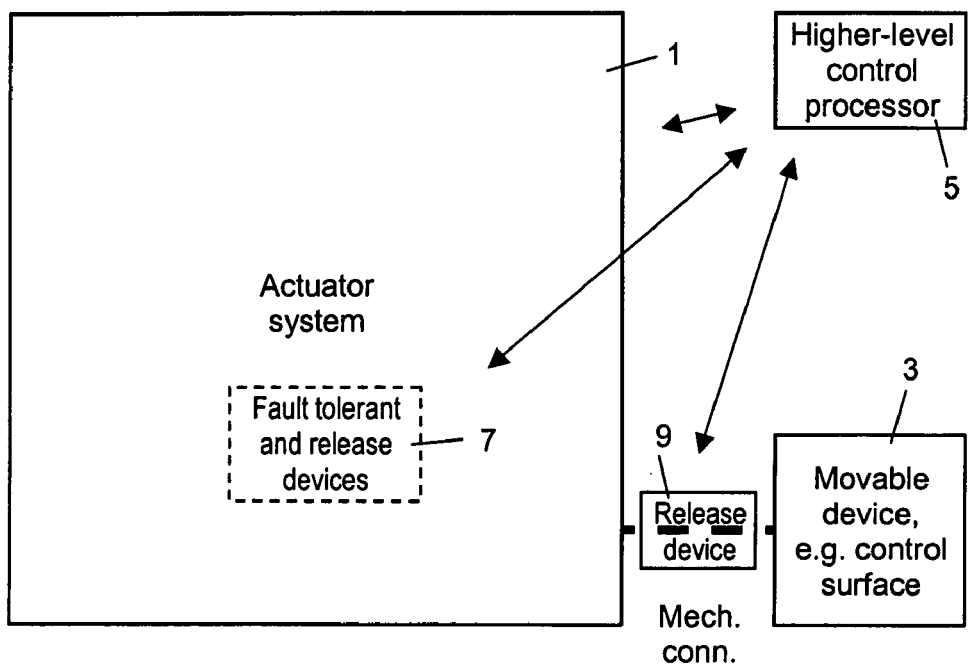
FIG. 20b is a schematic similar to that of FIG. 20a of a fault tolerant actuator and movement linkage system.
Figure 20C:
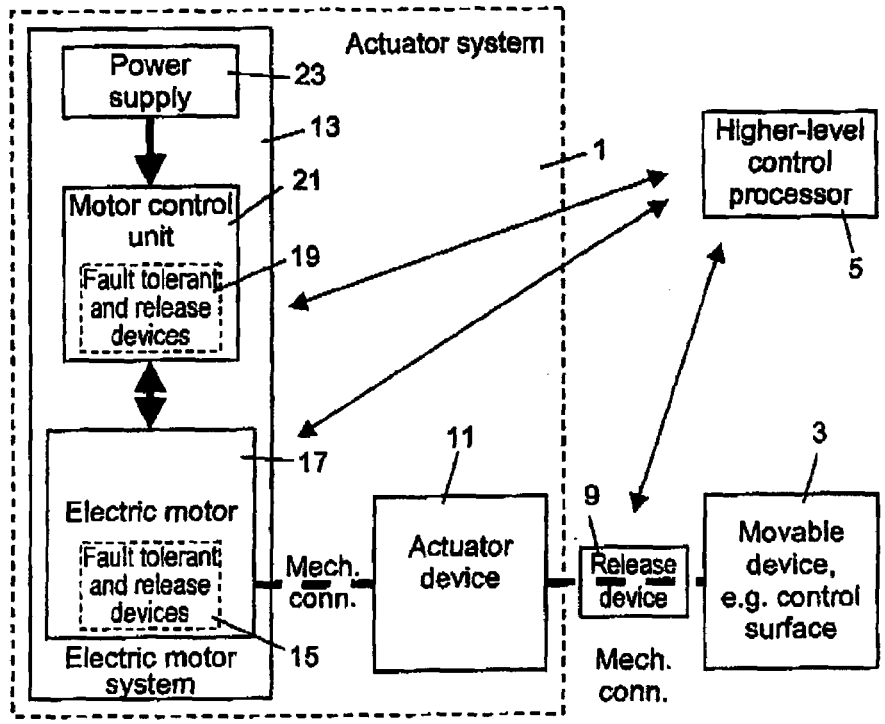
FIGS. 20c and 20d are diagrams similar to that of FIG. 20b showing more details of the fault tolerant actuator and movement linkage system.

More details of the fault tolerant actuator and movement linkage system of FIG. 20b are seen in the block diagram of FIG. 20c. The actuator system 1 includes an actuator device 11 and an electric motor system 13 having a high reliability and mechanically driving the actuator device. The fault tolerant and release devices of the actuator system have one portion 15 located in an electric motor 17 being part of the electric motor system and another portion 19 located in a motor control unit 21, also being part of the electric motor system which thereby is made fault tolerant. Generally, the electric motor system 13 includes a power supply unit 23 supplying electric power or electric current to the electric motor 17, the supply of electric power or current being controlled by the motor control unit 21. As appears from the block diagram of FIG. 20d, the electric motor 17 has an output device 25, such as a rotatable shaft, participating in the mechanical connection between the electric motor and the actuator device 11. Furthermore, the mechanical connection between the actuator device and the movable device 5 can include mechanical transfer units 27, e.g. linkage arms, that are connected by and locked to each other by the release device 9. The release device can then e.g. be a removable device such as a pin that normally locks the transfer units to each other but when removed allows the transfer units to move, at least to a limited extended, freely or substantially freely of each other.

Figure 1:
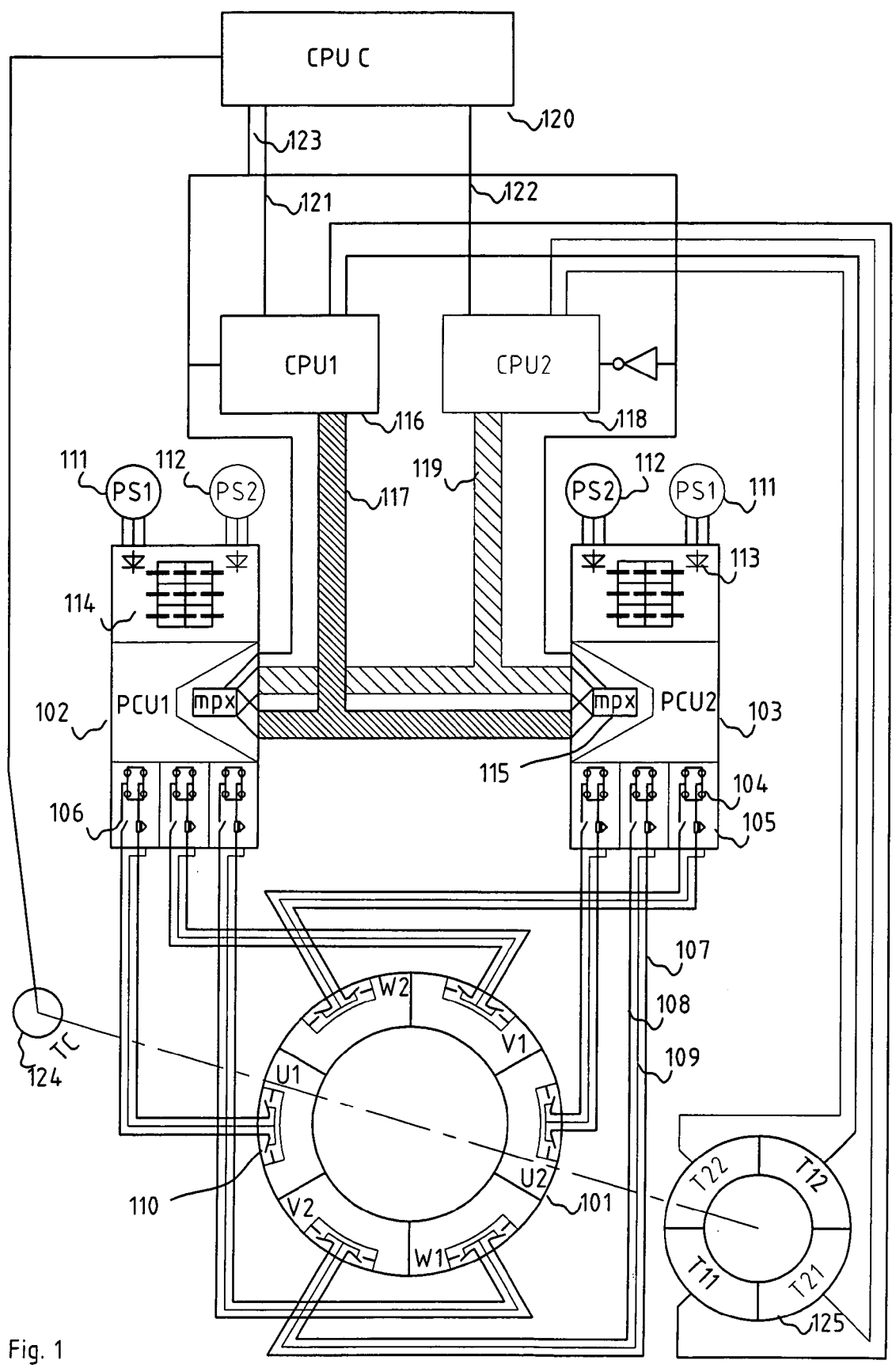
FIG. 1 is a block diagram of a control circuit for an electric motor.
Figure 20D:
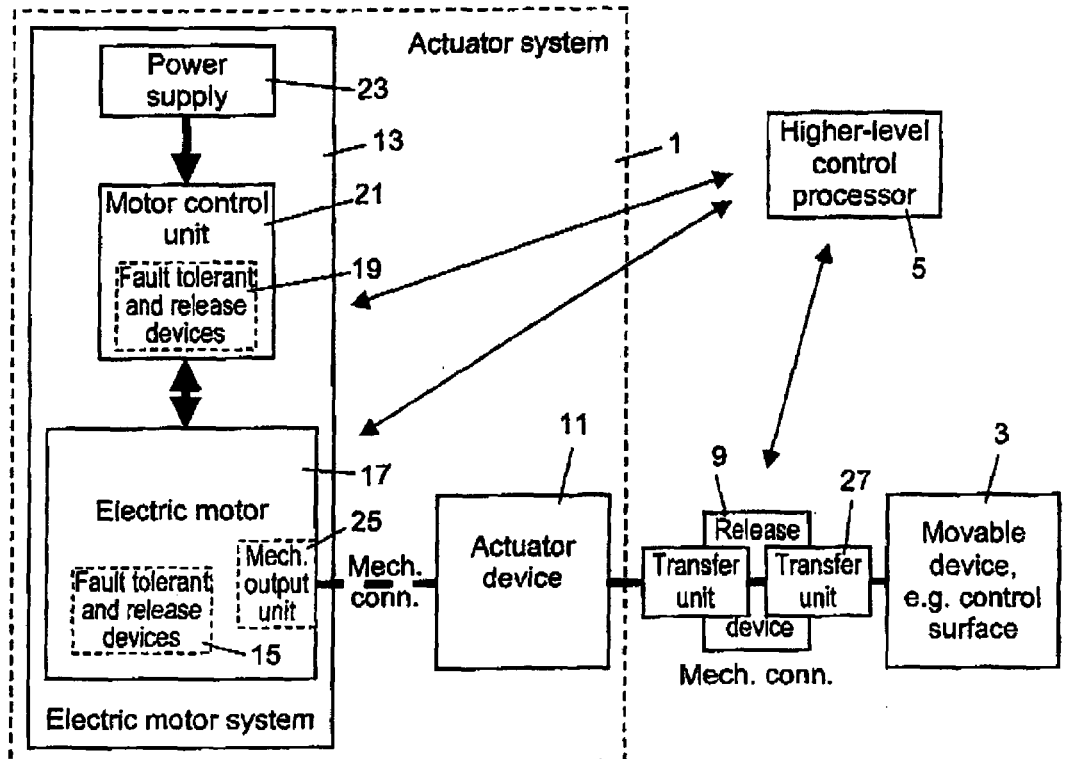

FIG. 1 is a block diagram of a control circuit for an electric motor system, such as the electric motor system of FIGS. 20c and 20d, having a high reliability. The electric motor system includes an electric motor 101. The electric motor 101 can be a motor according to the high reliability motor system disclosed in the published International patent application No. WO 2002/063760 for Stridsberg Innovation AB/Lennart Stridsberg. In the electric motor system there are two power control units 102 (PCU1) and 103 (PCU2), each of which drives three half motor phases U1, V1, W1 and U2, V2, W2, respectively, of the electric motor 101, i.e. controls the supply of power to the respective coils or windings, not shown, of the stator of the electric motor. A more detailed description of a power control unit is given with reference to the circuit diagram of FIG. 4 below. The coils or windings of the half phases are each connected to a four-switch H-bridge 104 in a power switch unit and the current in the coils or windings of each half phase can be measured by current transducers 105. Extra switches or controlled fusible links 106 in the power switching units are normally closed but can be opened in the case where one of the switches of an H-bridge 104 is permanently short-circuited.

The H-bridges 104 are connected to the coils or winding of the half-phases through conductors 107, 108. Optional control wires 109 may be added to make it possible to activate controllable fusible links 110 in the stator. These fusible links are normally closed but can be opened in the case where a short-circuit appears between coils of the stator of the electric motor 101 or between the conductors 107 and 108.

Each of the power control units 102, 103 is connected to at least two independent power supplies 111 (PS1) and 112 (PS2) and corresponding power handling systems, symbolized in the figure by a diode 113. In a system having two three-phase supplies, each such diode 113 may represent a set of six rectifier diodes. It may be advantageous that one of the power control units, e.g. PCU1, normally utilizes one power supply such as PS1 and that the other power control unit normally uses the other power supply. Each power control unit may have a rail voltage capacitor bank organized in serially connected groups of parallel power capacitors 114. This arrangement permits the power control units 102, 103 to operate even if one of the power capacitors decays to an open or short circuit state.

Each of the two power control units 102, 103 has a multiplexer 115 that permits the respective power control unit to be controlled by one of two central processing units (CPUs), either a first CPU 116 (CPU1) through a control bus 117 or a second CPU 118 (CPU2) through a control bus 119, these two central processing units also called motor controllers or motor control processors. One of the two motor control processors is therefore basically idle whereas the basic control of the six motor half phases is performed by the other, active motor control processor.

Furthermore, there may be provided a higher-level control central processing unit 120 (CPU C) that communicates with the motor controllers 117, 118 through channels 121 and 122. This higher-level processing unit may also control the multiplexers 115 through a control line 123. The higher-level central processing unit 120 reads the position or speed of the rotor, not shown, of the electric motor 101 using a position transducer 124 preferably having redundancy and provides commands, for example target speed, to the selected motor control processor such as 116 through a channel 121. In the case where the electric motor does not follow the commands or the active CPU 116 reports internal faults, the higher-level control central processing unit 120 can select the other motor controller, such as 118, by changing the logical level of the processor control line 123.

A unit 125 includes four position transducers 125 (T11, T12, T21, T22). Two of the position transducers T11, T12 are accessible to the first motor controller CPU1 and two of the position transducers T21, T22 to the second motor controller CPU2.

In FIG. 1, components that normally are in a stand-by state are shown in thin lines.

Figure 2:
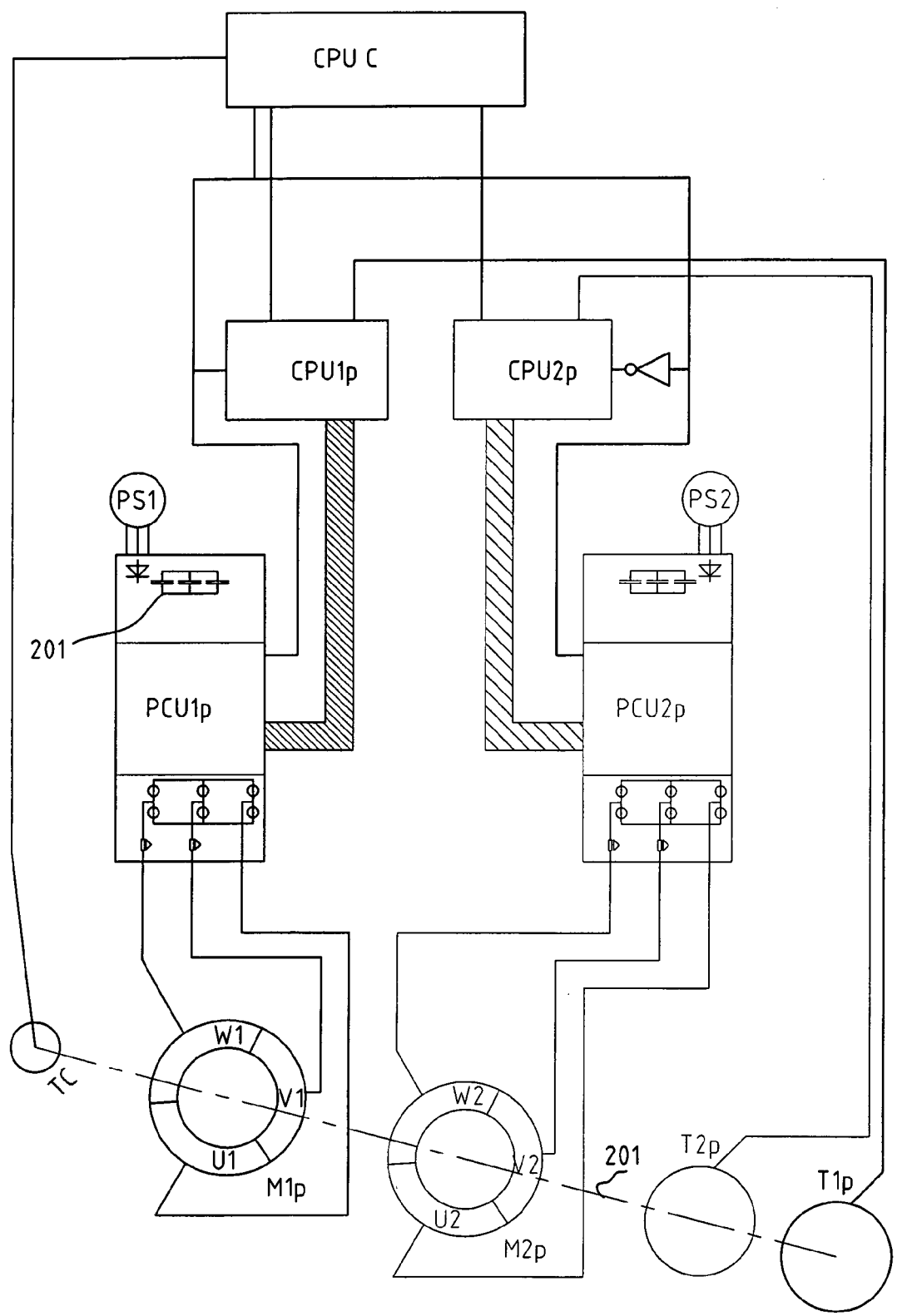
FIG. 2 is a block diagram of a control system for an electric motor according to prior art.

The schematic of FIG. 2 shows a parallel high reliability electric motor system according to prior art having two motor control processors CPU1p and CPU2p, two power control circuits PCU1p and PCU2p, two electric motors M1p and M2p having rotors, not shown, mounted to a common shaft indicated at 201 and two position transducers T1p and T2p. The electric motor M1p has phase windings U1, V1, W1 and the electric motor M2p has phase windings U2, V2, W2 connected in a conventional Y-configuration, each driven by six transistors. One of the two CPUp-PCUp-Mp-Tp systems is active; the other is in standby. In FIG. 2, parts that normally are in a stand-by state are shown in thin lines.

The system of FIG. 2 will be approximately twice as heavy as a normal electric motor system for the same power. Except the higher-level control processing unit CPU C, all parts are doubled. The effect on the mass and length of the electric motor system will be illustrated by FIGS. 7a–8b below.

Conventional brushless motor system have a set of capacitors, where each capacitor is connected between a positive rail and a negative rail. A short-circuited capacitor will therefore short-circuit the positive and negative rails. As will be described below, a short-circuit in any of capacitors will cause the connected motor such as M1p to be essentially short-circuited. Even if the parallel system CPU2p-PCU2p-M2p-T2p is activated, its electric motor M2p will meet a brake torque from the other electric motor M1p caused by the short-circuited windings of this electric motor M1p. If the two electric motors M1p and M2p are using the same heat sink towards the ambient, the heat generated by the short-circuited electric motor M1p will reduce the heat that can be dissipated by the other electric motor M2p.

Figure 3:
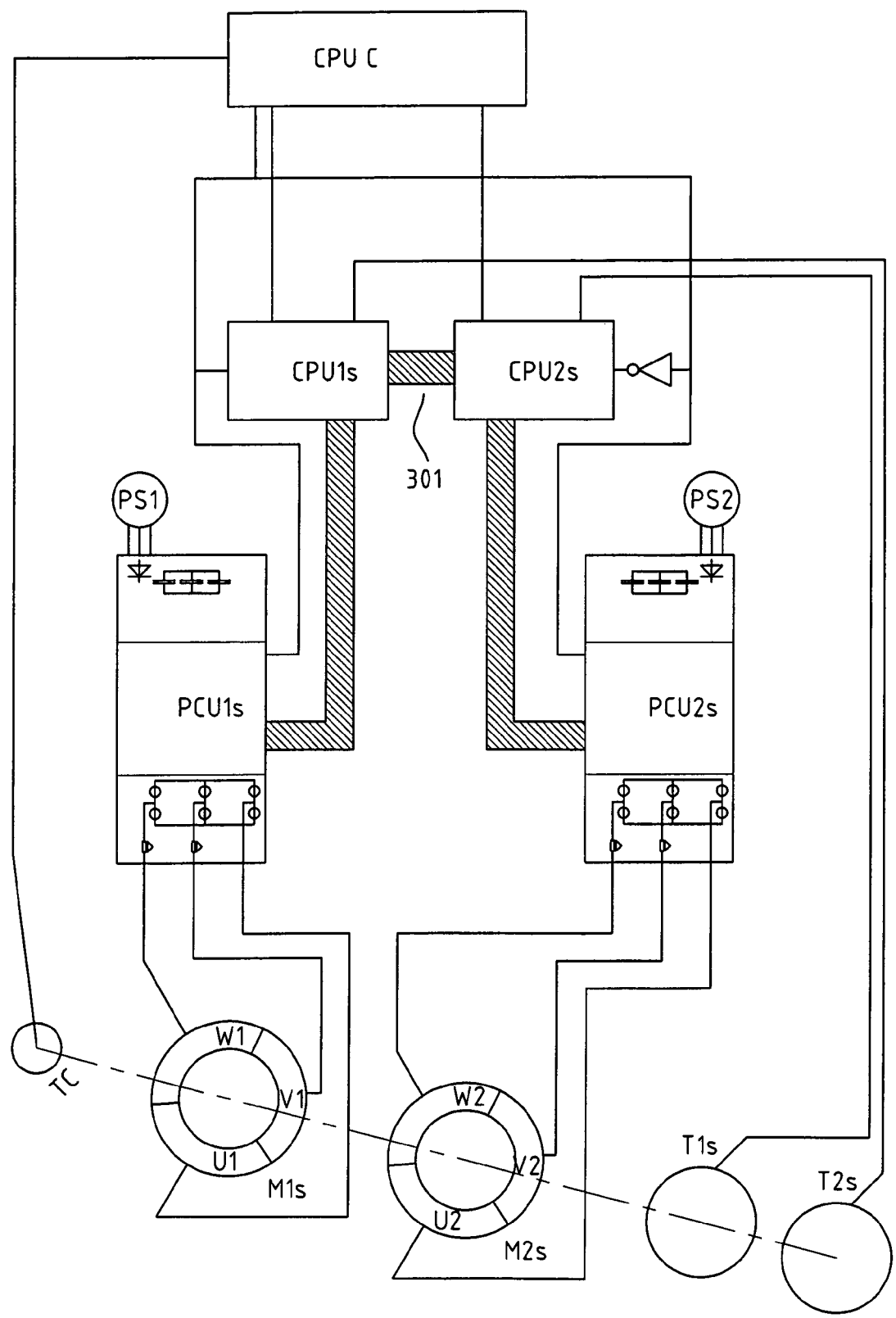
FIG. 3 is a block diagram of a control system for an electric motor according to prior art.

FIG. 3 is a schematic of a synchronized high reliability electric motor system according to prior art having two motor control processors CPU1s and CPU2s, two power control circuits PCU1s and PCU2s, two electric motors M1s and M2s having rotors, not shown, mounted to a common shaft with two position transducers T1s and T2s. In normal operation, the two CPUs-PCUs-Ms-Ts systems are both active. To avoid that noise or faults in the various transducers will cause the first motor control processor CPU1s to issue a clock-wise torque while the second motor control processor CPU2s issues a counter clock-wise torque, a sophisticated data exchange and voting system schematically shown at 301 is required. The cited U.S. Pat. No. 5,670,856 handles these problems using information exchange between the motor control processors, corresponding to CPU1s and CPU2s in the two channel system shown in FIG. 3. Each CPU in said patent has feedback data on the speed, current and rotor position of all electric motors and the speed command that it has received from the higher-level central processor. In the case where some of these data do not fit together—the positions and speeds for all three electric motors should reflect the speed of the common pinion and should thus be identical—some decision must be made which data that should be used. It therefore has a devoted DSP, 42 in FIG. 3 of U.S. Pat. No. 5,670,856, and a synchronizer and voting device, SVC, item 54 in FIG. 3 of the patent, to exchange information with the other two CPUs on the corresponding data regarding their system. The large number of hardware and software faults that might appear will make testing of this prior system in all fault modes and in all flight conditions difficult and extremely expensive.

The electric motor system of FIG. 3 is similar to that of FIG. 2 in that a short-circuit in a rail to rail capacitor will cause the electric motor in the affected part system to act as a dynamic brake against the remaining part of the electric motor system.

The servo control task given to the motor control processors 116, 118 (CPU1 and CPU2) shown in FIG. 1 is from a software and testing point of view very straightforward. In its normal operation, each motor control processor has to handle a task that is very similar to that of a standard servo controller. It may have two position transducers to read while there is only one in a conventional servo system. As long as the two position transducers agree, this will not pose a problem. If they do not agree and there is no simple way to prove that one of the transducers obviously is defect, the motor control processor can declare itself inoperable and transfer the control to the idle motor control processor. There are six four-switch H-bridges 104 to control. This may require some more processing than the processing required to control a conventional six-switch bridge used in most brushless motor systems. As the latter was routine work for electronic processors available in the year 1994, the handling of six four-switch H-bridges does not pose any problem for electronic processors available in the year 2005. Furthermore, calculations for a four-switch H-bridge is far simpler than for a six-switch bridge.

In the electric motor system of FIG. 3, if one of the motor control processors CPU1s or CPU2s fails, the electric motor that it controls will, at best, be running idle with no active torque, which will reduce the total available torque considerably. The loss of one of the motor control processors CPU1 or CPU2 in the electric motor system of FIG. 1 will not affect the available torque at all.

Figure 4:
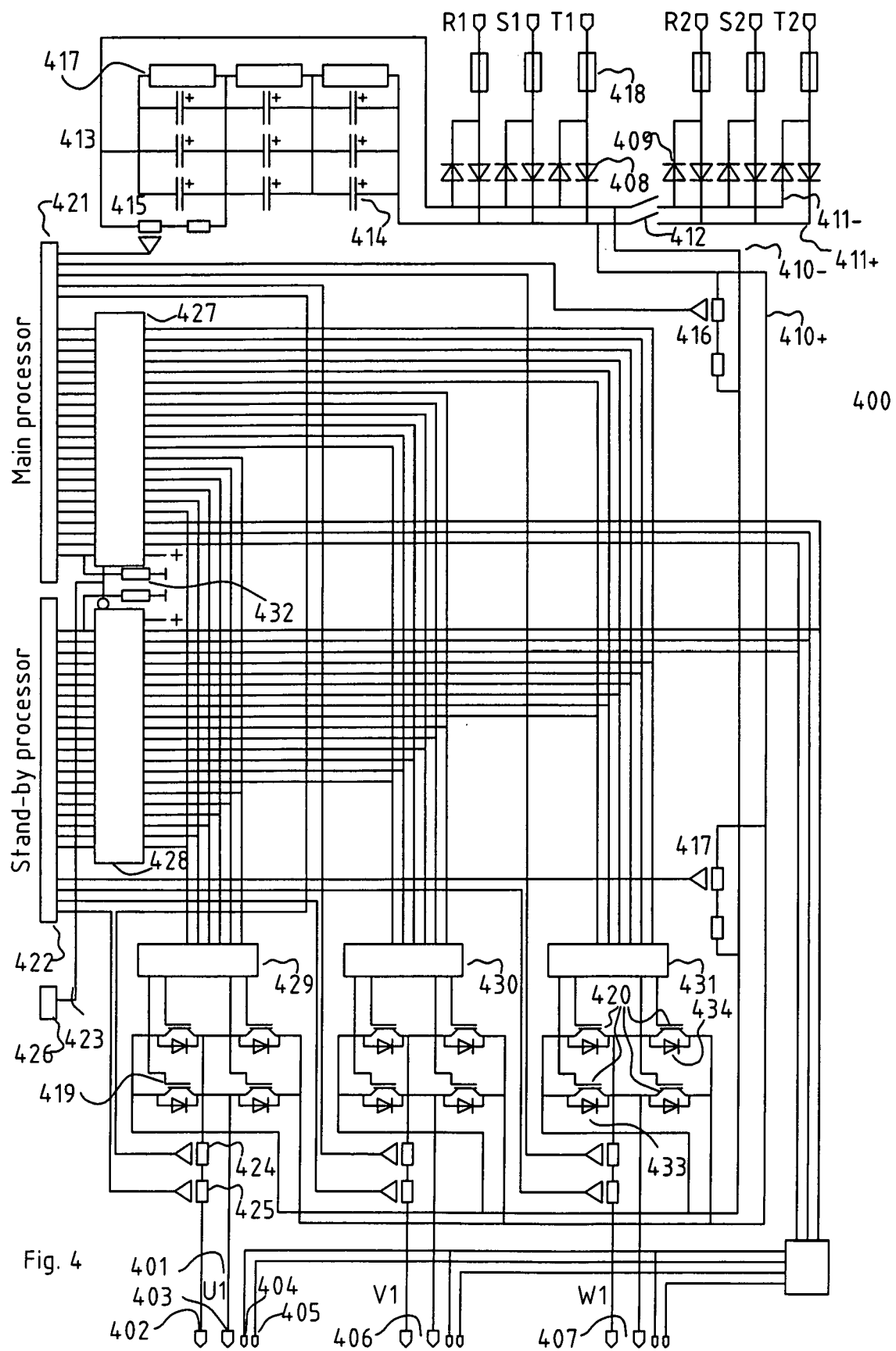
FIG. 4 is a circuit diagram of the power control unit of FIG. 1.

FIG. 4 is a circuit diagram of a power control circuit 400 such as the PCU1 103 in FIG. 1 for an electric motor, not shown.

The fuses used in the electric motor system of the cited International patent application No. WO 2002/063760, compare the fuses 401 of FIG. 4 of that patent application, are controlled solely by the electric currents flowing through the fuses and the temperature at the place of the respective fuse, normally thermally very close to the stator coils. For some error types such as a short-circuit between the two phase conductors in the cable from the electric motor to the electronic power circuits, the rotor of the electric motor has to rotate at a rather high speed to create sufficiently high currents and/or temperatures to blow the fuse. For many applications such as actuators for aircraft control surfaces, this will require unwanted movements not only of the electric motor but also of the aircraft unless compensatory movements by other control surfaces can be activated.

This problem can be handled by adding controllable switch elements such as electrically controllable circuit breakers. They can be of many different technologies such as relays. In the following, the description will be based on fuse blow control circuits. The fuse blow control circuit can, when enabled, cause a fuse in the stator of the electric motor to blow. The half phase U1 has as shown in FIG. 4 therefore a set 401 of four connection terminals, where the connection terminals 402, 403 are the conventional half phase current terminals, to be connected to the windings of the U1 half phase, and the connection terminals 404, 405 are stator circuit breaking control terminals as will be described hereinafter. For the other half phases V1 and W1 similar terminal sets 406 and 407 are provided.

Electric power in aircraft is often supplied as two or more basically independent three-phase AC systems, often with all power supply AC systems having their center points connected to each other and to the aircraft frame. The power control circuit in FIG. 4 has inputs for two power supply AC systems. The currents of the first power supply AC system, provided at input terminals R1, S1, T1, are rectified by six diodes 408 in the conventional manner. The currents of the second power supply AC system, provided at input terminals R2, S2, T2, are rectified by six diodes 409. The six diodes of each set are at their sides opposite the connection to the input terminals, connected to DC rails, the first set connected to positive and negative DC rails 410+, 410− and the second set connected to positive and negative DC rails 411+, 411−. Switches or circuit breakers 412, also called power supply bridging switches, are connected between the positive DC rails and between the negative DC rails to allow only connection to the first power supply AC system or connection to the two systems in parallel to each other. In the case where indirect paralleling of the two power supply AC systems by paralleling to the same DC rails, not shown, using two diode sets as shown is permitted, the circuit breakers 412 can be eliminated, the positive DC rails 410+, 411+ then always connected to each other and the negative DC rails 410−, 411− always connected to each other.

The electrical current rectified by the diodes 408 and provided on the DC rails 410+, 410− is averaged or smoothed by an averaging circuit 413 including a plurality of capacitors 414. The averaging circuit has a total capacitance adapted to the operational characteristics of the electric motor. Failure of a single capacitor 104 in the averaging circuit can be tolerated by deriving the total capacitance from several, in the case shown 3×3, equal capacitors 414 connected as three parallel triplets in series with each other. An open circuit failure of one of three capacitors in a parallel triplet will reduce the total capacitance of the total capacitor system by 14%. A short circuit in one of the nine capacitors 104 will increase the voltage over the two other parallel triplets by 50% and incidentally increase the capacitance of the total averaging circuit by 50%. Any of these errors will change the relation of the voltages over detectors 415 and 416 connected to sense these electric quantities; the voltage detector 415 over one layer of capacitors and the voltage detector 416 the total voltage between the positive and negative DC rails 410+, 410−, respectively. This makes serious capacitor errors detectable by the detectors while still permitting normal operation of the power control unit and its connected motor phases. In the power control unit circuit 400 shown in FIG. 4, the voltage detector 415 sensing the voltage over one layer of capacitors can only be read by that one of the motor control processors (CPU1, CPU2 of FIG. 1) that is the normal one and e.g. is active from the start of the electric motor system—the first motor control processor CPU1 (116) as indicated in FIG. 1, this motor control processor called the main processor and the other one called the stand-by processor. If the short-circuiting of a capacitor occurs while the main processor is disconnected, a capacitor fault will be reported first after replacement of the main processor.

Figure 6A:
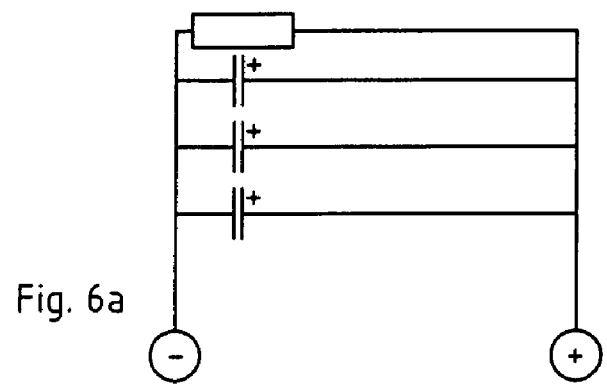
FIG. 6a is a circuit diagram of a simple averaging circuit.
Figure 6B:
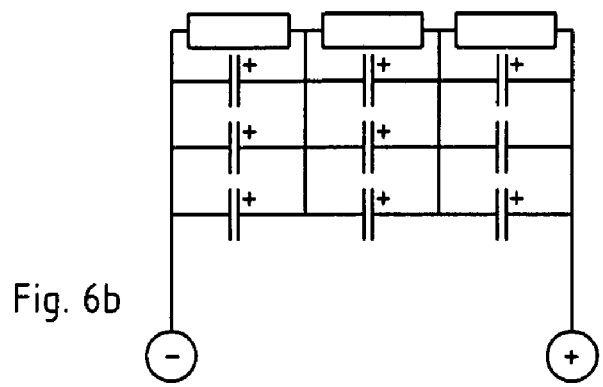
FIG. 6b is a circuit diagram of a 3×3 averaging circuit for use in the power control unit of FIGS. 1 and 4.

Examples of such an averaging circuit 413, also called a capacitor circuit or capacitor bank, based on "BC components" type 2222 159 series of capacitors are given in Table 1 and FIGS. 6a–6d. Each row in Table 1 corresponds to a system shown in a respective one of these figures. Each averaging circuit is designed to handle a ripple current of 3 A at 400 V even if one capacitor fails and forms an open circuit. The first example of the capacitor circuit, see FIG. 6a, has three capacitors connected in parallel to each other and can handle currents of up to 3.44 A if one of the three capacitors fails and forms an open circuit. Data for the capacitors used and the maximum permitted current after a single capacitor open circuit failure for the circuit shown in FIG. 6a are listed in the first row of Table 1. The second example of the capacitor circuit has nine capacitors connected as shown in FIGS. 6b and 4 in three parallel groups. Corresponding data are given in the second row 2 of Table 1. In the case where one of the capacitors fails into an open state, the circuit of FIG. 6b can handle a ripple current of 3.16 A as at least two capacitors in each parallel group remain after a single failure. In the case of a short-circuited capacitor, the circuit of FIG. 6a will fail completely, since the DC rails are short-circuited.

A short-circuit in a capacitor connected directly between two DC rails such as 410+ and 410− will practically short-circuit an electric motor connected to a switched motor control system using the short-circuited DC rails. If a motor phase winding connected to the terminals 407 has an emf over some two volts, caused by a rotating rotor of the electric motor, a current can flow for example through the diode 434 to the rail 410+. It can then pass the short-circuited capacitor to the rail 410− and further through the diode 433 back to the coils of the motor phase. Since the capacitor circuit is common to all six switches in a conventional switched motor controller, there will be open diodes regardless of the polarity of the motor emf.

A short-circuited capacitor in the capacitor circuit of FIG. 6b permits the electric motor system to remain fully operational. Actually, it can handle higher currents than in normal status. When operating without faults, the capacitor circuit of FIG. 6a will work under full voltage, i.e. 400 V over each capacitor, and 58% of nominal current, whereas the capacitor circuit of FIG. 6b will work under 400/3=133 V which is 63% of the 200 V rating, and 67% of rated current. Operation with lower than specified stresses normally provide longer MTBF (Mean Time Between Failure). The failure rate calculated using normal aircraft failure data for the nine capacitors of the averaging circuit of FIG. 6b is lower than the failure rate calculated for the conventional arrangement shown in FIG. 6a. The arrangement of FIG. 6b does not only provide a dramatically reduced probability of functional failure, it also increases the mean time between harmless but service requesting failures.

The quantities U, C, I, h and D in Table 1 stand for data for one capacitor. The height and diameter has been used to calculate the volume required for each capacitor and the total volume of the averaging circuit. The significant improvement in sensitivity to capacitor short-circuit failure is in the example given obtained with an increase of 36% of capacitor volume and capacitor mass, when using three layers of capacitors connected in series with each other. Using four layers, connected such as outlined in FIGS. 6c and 6d, the averaging circuit 413 and hence the power control circuit 400 can work at full power even with any of two capacitors short-circuited, with one capacitor short-circuited and any of the remaining ones in open circuit and in nine out of eleven cases with two capacitors forming open circuits.

In industrial system having a rail voltage of some 600 V, the capacitor bank is often made from pairs of 400V DC capacitors in series. Such designs will not operate with one capacitor short-circuited as the remaining 400 V capacitor does not withstand the full 600 V rail voltage.

Figure 6C:
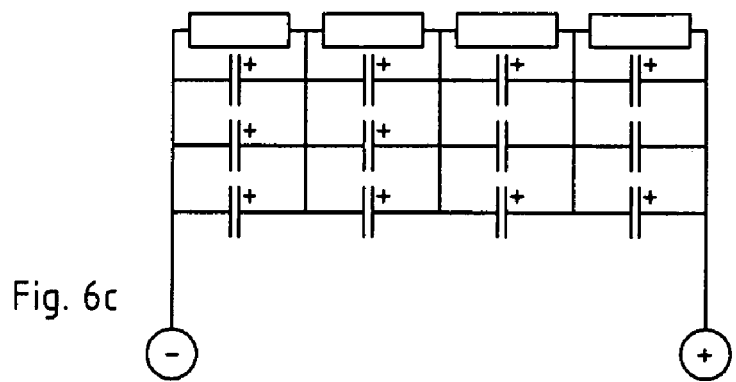
FIG. 6c is a circuit diagram of a 3×4 averaging circuit.
Figure 6D:
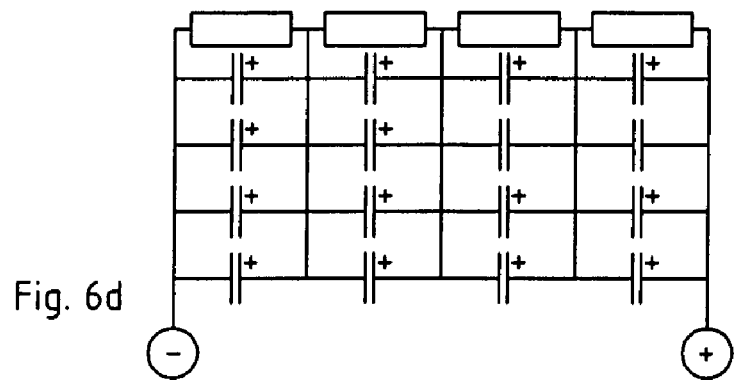
FIG. 6d is a circuit diagram of a 4×4 averaging circuit.

A redundancy effect similar to those obtained by the systems shown in FIG. 6b–d may be obtained if groups of serially connected capacitors are connected in parallel. However, this will give a lower performance and require more voltage sensors to identify faulty capacitors.

In the averaging circuit 413 resistors 417 are connected in parallel with each layer of the parallel capacitor groups to balance the differences in capacitor leakage currents and also to ensure that the voltage over the averaging circuit will decrease after system power off.

The optional circuit breakers 412 can be activated to take a closed state, instead of their normal open state, by a control device, not shown, if the voltage sensed by any of the voltage detectors 416, 417 falls below a predetermined limit. The feature so far described will permit the power control unit to operate properly even if one of the two power supply AC systems ceases to operate and even if one capacitor in the averaging circuit 413 will form a short-circuit or break to form an open circuit. A failure of one of the diodes 408 into a short-circuit state will cause a corresponding current limiting fuse 418 to blow. The current limiting fuses are normally connected in the power supply end of the cable between the respective power supply AC system and the power control circuit shown in FIG. 4, but can also as illustrated be connected in the lines between the input terminals R1, S1, T1 and R2, S2, T2 and the diodes 408, 409.

The power control circuit 400 of FIG. 4 is, as has already been mentioned, connected to two motor control processors, the main processor CPU1 and the stand-by processor CPU2, not shown in this figure. CPU1 will in normal cases issue all the commands to power transistors 419, generally acting as semiconductor power switches, in the H-bridges 420 that correspond to the H-bridges 104 of FIG. 1. These power switches control the connection of the DC rails 410+, 410− to the output terminals such as 402, 403 for the windings of the half phases. The same motor control processor also commands other components that might be controllable such as the circuit breakers 412 and over-current alarm resets, not shown. This main processor is connected to a multiple-line connector 421. The other processor, the stand-by processor CPU2, that is connected to the multi-line connector 422, can be idling in a stand-by mode. Alternatively, it can monitor the operation of the main processor or monitor the safety system of the electric motor. The processor select line 423 has basically the same function as the line 123 in the circuit diagram of FIG. 1 and the lines passing the connectors 421 and 422 of FIG. 4 correspond to the two control busses 117 and 119 of FIG. 1.

To reduce the possibility that a faulty processor board of one of the two motor control processors will affect detector signals and to permit failure of a detector, the important analog detectors are separate, insulated or individual for each motor control processor. Examples are the rail voltage detectors 416 for the main processor and 417 for the

TABLE 1

| $U_{nom}$ V | C uF | $I_{A\,rms}$ | h mm | D mm | V mm³ | n | I (one open) | | V tot mm³ |
|---|---|---|---|---|---|---|---|---|---|
| 400 | 470 | 1.72 | 45 | 35 | 43273 | 3 | 3.44 | FIG. 6a | 129819 |
| 200 | 470 | 1.58 | 40 | 25 | 19625 | 9 | 3.16 | FIG. 6b | 176625 |
| 200 | 470 | 1.58 | 40 | 25 | 19625 | 12 | 3.16 | FIG. 6c | 235500 |
| 200 | 470 | 1.58 | 40 | 25 | 19625 | 16 | 3.16 | FIG. 6d | 314000 | stand-by processor. Another example is the current detectors for each half phase winding, such as, for half-phase winding U1, item 424 for the main processor CPU1 and 425 for the stand-by processor CPU2. Detectors like 416 connected to the main processor could advantageously obtain their supply power from the power supply of the circuit board of the respective motor control processor to avoid that a common detector power supply fault will disable for example both the voltage detector 416 and the voltage detector 417.

Some device or procedure must be used to select which of the two motor control processors that will be enabled to control the power contol unit circuit 400. This is schematically exemplified by a connector 426 that is coupled to a signal conductor 423, also called selection line, and is assumed to be driven to a high logical level by whatever system that is designed to handle processor selection. This can be a higher-level central processor such as CPU C of FIG. 1. Alternatively, it can be handled by software and hardware in the main processor CPU1. The selection line 423 will then be kept on a high logical level as long as the self-diagnosis system of the main processor indicates that the main processor is fully operational. As long as the signal on the selection line 423 has a high logical level, commands form the main processor will pass the buffer 427 and reach the power transistors 419 in the H-bridges. The control units 429, 430, 431 for the power switches can be DC insulating devices like opto couplers or inductive couplers. In the circuit diagram of FIG. 4, they are drawn including six connection lines towards the motor control processors, including for example four on/off inputs for the power switches, an over-current trip output and an over-current reset input.

The stand-by processor CPU2 may read the status lines through the gate of its buffer 428 and the measurement data through its dedicated detectors such as the voltage detector 417 and the current detector 425. The buffer 428 will block any commands possibly issued by the stand-by processor as long as the logical level on the selection line 423 is kept high. Both motor control processors can also detect the status of the signal on the selection line 423—in the shown embodiment because an active buffer such as the buffer 428 will keep the voltage over a pull-down resistor 432 high. The stand-by processor can therefore take over control in the case where the main processor is declared inoperable by the signal level on line 423.

Figure 5:
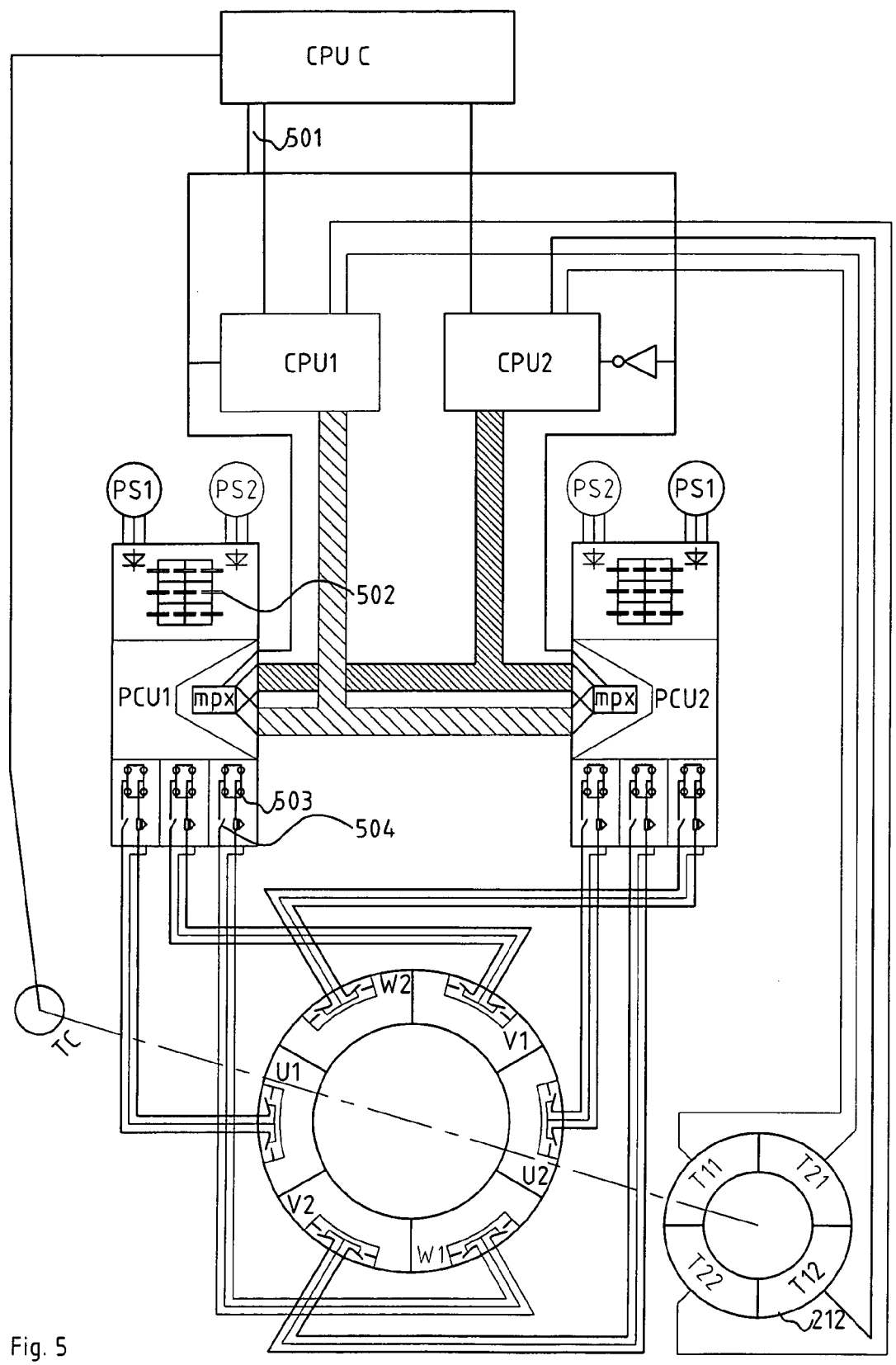
FIG. 5 shows the system of FIG. 1 operating in a condition with several faults

FIG. 5 is a schematic diagram similar to those of FIGS. 1 and 2 and shows how an electric motor system as of FIG. 1 can maintain its functionality even if various parts cease to operate. Non-operational parts are shown in thin lines.

It is assumed that the main processor CPU1 has ceased to operate, and therefore the electric motor system is controlled by the stand-by processor CPU2, a decision taken by the higher-level control central processing unit CPU C which has changed the logic level of a selection line 501.

Furthermore, it is assument that the second power supply system PS2 has ceased to operate. This does not affect the main processor PCU1, which is connected to primarily use the first power supply system PS1. The stand-by processor PCU2 is connected to normally use the second power supply system PS2, and the failure of the second power supply system PS2 has caused the stand-by processor PCU2 to enable its use of the first power supply system PS1.

A capacitor 502 in the averaging circuit of the first power control circuit PCU1 has been short-circuited, but this does not affect the operation of the first power control circuit PCU1 but for the fact that the ripple of the voltage between the DC rails 410+ and 410− has changed. In this fault condition, it has actually decreased as the capacitance has increased.

The power transistor 503 in the H-bridges controlled by the first power control circuit PCU1 has been short-circuited, and the extra switch or controlled fusible link 504, which during normal operation is always closed, has been forced into an open state to break the short circuit otherwise permitting the half phase W1 to induce a large electrical current.

Finally, it is assumed that the position transducer T11 in the unit 212, that corresponds to the unit 125 in FIG. 1, has ceased to operate. Each of the two motor control processors has two transducers connected to it. Assuming that the position transducers provide signals that permit the connected motor control processor to distinguish between a normally operating state and a defect state, the stand-by motor control processor CPU2 can operate using information from the transducer T12 only. For example, transducers that give two sinusoidal signals 90° out of phase in relation to each other can be tested by adding the squares of the two signals. Most faults in one of the transducers will cause this sum to change significantly, thus permitting the connected motor control processor to identify the trustworthy device.

When combined with an electric motor system as disclosed in the cited International patent application No. WO 2002/063760, the motor control circuits as described above can provide substantial improvements as to mass, weight, cost and probability of serious functional failures.

The mass reduction of the motor components is illustrated by the schematic sectional views of FIGS. 7 and 8. These figures show electric motor pairs. The electric motors shown in FIGS. 7a and 8a are designed to deliver a certain continuous torque when driven by a system such as that shown in FIG. 5 where one of the six connected H-bridges has ceased to operate. FIGS. 7b and 8b are views of dual motor systems, where one of the two electric motors work with a fully operating power control unit and the other electric motor runs idle. All four motor systems dissipate the same amount of heat and deliver the same torque. The views of FIGS. 7a and 7b show electric motors designed to operate at low average speeds. The iron losses caused by magnets moving over the stator poles is therefore low and copper losses dominate. With the motor technology and load points used, the prior art electric motor system of FIG. 7b is 1.8 times heavier and 1.9 times longer than that of FIG. 7a.

The views of FIGS. 8a and 8b show electric motors designed operate at high average speeds. The iron losses caused by magnets moving over the stator poles are therefore considerable. As these losses appear in both of the two electric motors of FIG. 8b even though only one of them is active, these electric motors must be able to deliver the required torque with lower copper losses in order to keep the total losses within the limit. With the motor technology and load points used, the prior art electric motor system of FIG. 8b is 2.1 times heavier and 2.1 times longer than that of FIG. 8a.

Figure 9:
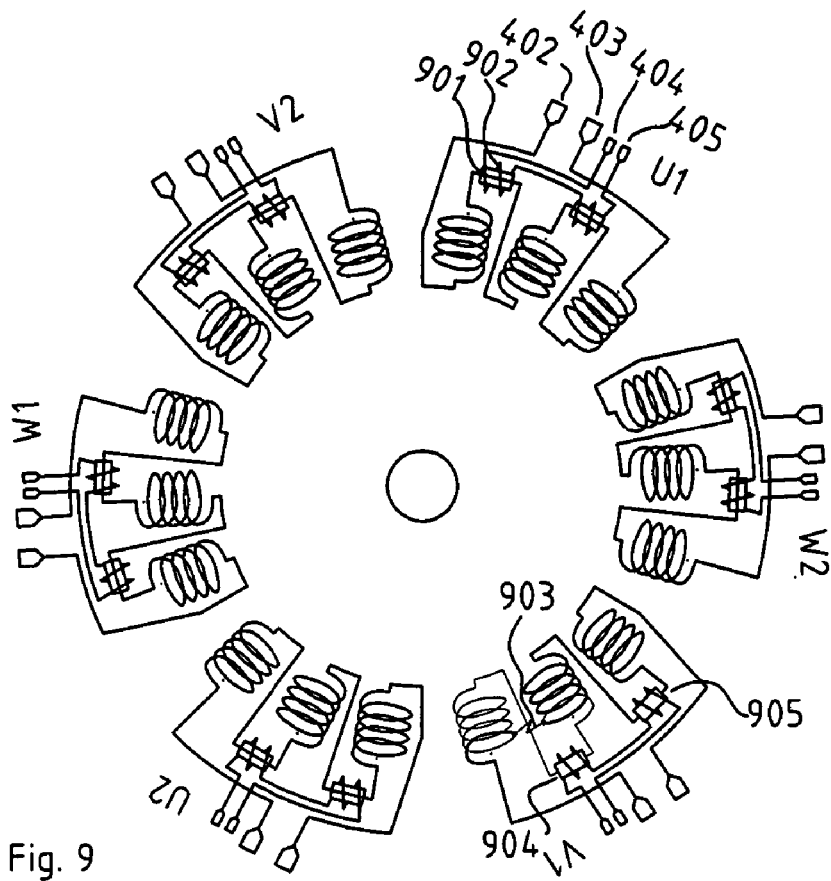
FIG. 9 is a circuit diagram of windings of the stator of a electric motor including controllable fuse elements.

The schematic of FIG. 9 shows the windings of a stator of an electric motor having devices that can be commanded to break the stator current independently of the power switches in the H-bridges of the power control units. The devices can be controllable switching elements like 901–902, also called controllable fuses or simply fuses, and they can be relays or non-resettable circuit-breaker elements. One way to obtain such a controllable switching element is to combine a thermal fuse 901 with a local heater such as a heating coil or resistor 902. This seems to offer substantial advantages.

There is a large experience of thermal fuses that permanently break an electric connection at a certain temperature and that can break considerable currents at high voltages. An example of such devices is the "Thermal Cut-Off" sold by NTE Electronics, Bloomfield, N.J., USA. The addition of a local heater to such a thermal fuse can provide a light weight switch that can be used to disconnect phase windings of an electric motor permanently. Another advantage is that a controllable switching element including a thermal fuse and local heater will blow without any command current from the terminals 404–405 if the adjacent stator coils reach a very high temperature.

A short circuit over a major part of a stator coil is illustrated by a short-circuit 903 over the outer turns of two adjacent coils. This short-circuit has been disabled by the controlled opening of the fuse 904. As the command current is common for the fuses 904 and 905, both have been opened.

Figure 10:
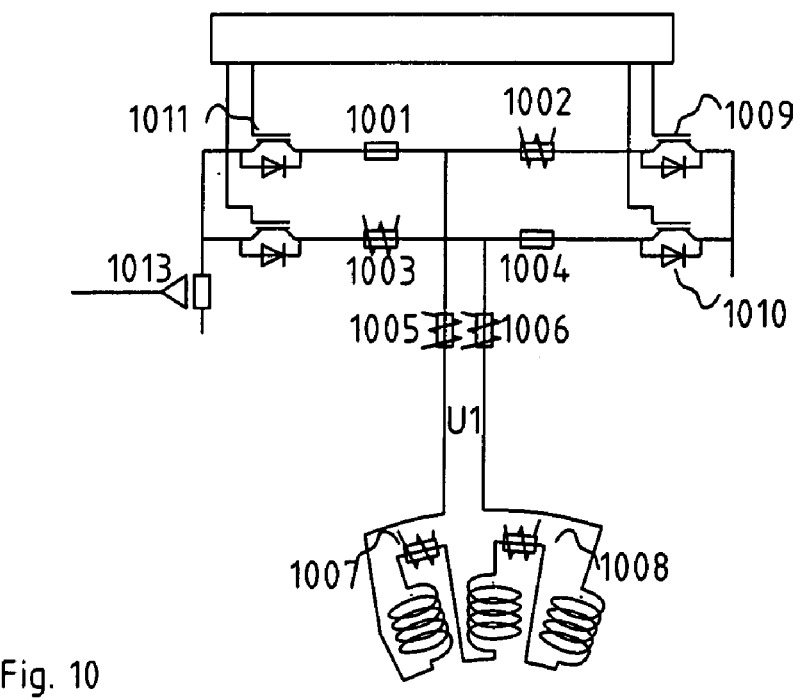
FIG. 10 is a circuit diagram showing possible positions of controllable fuses and/or other switches.

FIG. 10 shows possible positions for conventional or controllable fuses.

A short circuit over one or more stator coil anywhere from the terminals in the electric motor down to the power electronic circuits can be handled by any one of fuses 1007 and 1008. If the probability of a short circuit over two coils as well as the risk of failure in the fuse blowing command is judged to be negligible, the fuse 1008 can be omitted because one fuse then is enough.

A short circuit in one of the four diodes or four transistors, for example in transistor 1009, will cause electrical current induced in the motor coils to flow through the short-circuited device and one of the other diodes, in the example diode 1010. A short-circuited supply rail, for example due to a short-circuited rail capacitor in a system according to prior art, would cause similar electrical currents, for example through the diode 1010 and the diode adjacent to transistor 1011. Any single fuse in positions 1002, 1004, 1005, 1006, 1007 or 1008 will stop such currents. For this error type, conventional non-controllable fuses might be used if they can be blown using the three functional switches of the H-bridge to create an electrical current large enough to quickly blow the fuse, and if this electrical current can be maintained without causing damage in the affected stator coils, H-bridge switches, etc.

A short circuit over two transistors in the same bridge leg, for example 1009 and 1011, would short-circuit the power capacitors; this could be handled by conventional fuses 1001 and 1004 that handle large electrical currents and controllable fuses 1002 and 1003 that handles medium currents detected by a current detector 1013 in a situation where all four transistors are commanded to be off and electrical currents generated by the coil inductance should have ended.

It is not recommendable to use fuses in position 1007 or 1008 to handle failures in the electronic power circuits. Such faults would then require a replacement not only of the easily replaced electronic power circuits, having the initial fault, but also the electric motor, since it has been intentionally damaged by blowing a fuse to handle a fault in the power electronic circuits.

The controllable fuses of FIG. 9 can stop faults in power switches such as causing unpermitted heating of stator coils. Thereby the repair activity can be restricted to replacement of electronic boards in place of an otherwise required exchange of complete actuator units.

An implementation can have one controllable fuse in position 1007 to handle cable short circuits, a relay in position 1006 to handle single short circuits in one transistor or diode and conventional fuses 1001 and 1004 to handle simultaneous short circuits in transistor pairs such as the transistors 1009, 1011.

An internal short-circuit over a whole or a major part of a stator coil will in most cases create unacceptable temperatures if the electric motor is run at high speeds for a long period. If used in a flight control surface actuator, the affected actuator should be kept static or with only slow movements whenever the aircraft can be controlled without using the coil short-circuited actuator. This will keep the actuator temperature low and permits almost normal operation during a short period such as landing.

In the absence of faults, the electric motor system of FIG. 1 having a power control unit according to FIG. 4 can operate with all six half phases active. Therefore, the copper losses are normally less than when only five of the six half phases are active. The total losses during such normal operation is therefore only some 83% of the losses obtained with five of the six half phases active, permitting a lower temperature rise and a longer life for each component of the electric motor.

The power control circuits shown in FIGS. 1 and 4 have a total of 24 power switches, also called transistor switches or switch transistors. These switch transistors switch the current used by one half phase. Since this half phase meet the full rail voltage it can have four times the winding turns of a conventional Y-connected electric motor since the phases in a Y-connected electric motor will each meet approximately half the full rail voltage. The required current rating is only some ¼ of that of the switch transistors in the power control circuits PCU1$p$ and PCU2$p$ of FIG. 3. These switch transistors must deliver the current required to run one full phase and each power stage requires six transistor switches with four times larger rating than those of FIG. 4. This means that the semiconductor parts of the electric motor system shown in FIG. 2 has approximately twice the mass and twice the cost.

Taken together, the electric motor system as described above with reference to FIGS. 1 and 4 has some 50% lower mass and dimensions both for the electric motor part and the electronic power parts when compared to the electric motor system shown in FIG. 2.

As is obvious for those familiar in the art, the basic principle shown in the embodiment according to FIGS. 1, 4, 9 and 10 can be modified in many ways.

Some features normal for motor current control circuits have been omitted in order to make the figures less complex. For example, temperature sensors are important but are not shown in the figures. Most implementations are likely to have other information exchange channels between the main and standby processors and to the higher-level flight control processor, which would require adaptations of the circuits shown. The higher-level control processor normally uses redundancy, not shown, to increase its reliability, for example by having its position sensors like 124 tripled and several command channels replacing the single channel 121. The connections between power control units and motor control processors are shown as parallel data busses with parallel analog data channels; other data transfer arrangements are within the principles of the invention.

Regenerated power must be dissipated over brake resistors and switches, not shown, or fed back to the power system using devices not shown. Motor current control electronic circuits normally contain circuits to detect a large overcurrent caused for example by a short-circuit between a motor phase coil and ground or over a motor phase coil and to switch the power transistors off in such cases. Such circuits are assumed but not shown. An electronic failure in one of the motor control processors must not be permitted to destroy the multiplexers like 115 or buffers like 427, 428 in such a way that a destroyed buffer can influence commands sent by the operating motor control processor through the operational buffer. This can be handled by conventional protection circuits, not shown, connected between the connector like 422 and the respective buffer 428. The implementation shown is designed for two three-phase power supply AC systems. With some obvious changes a dual DC supply can be used as well as more than two power supply systems.

For implementations where the stand-by processor is engaged in monitoring the active processor, the current detectors like 424 can be inserted in the conductor 402 and the current detectors like 425 in the other conductor 403 that together drive a half-phase. Large leakage currents in the phase winding of the half-phase can then be detected as a difference between the two currents.

The device/devices used to identify a processor failure is/are only schematically given. Such devices can include software watchdogs, processor voltage monitors, and/or a parallel diagnostic processor. Performance control can be made by the main processor, for example, comparison of the current response expected and current response received; such tests can identify a faulty windings or a faulty transistor, but also faulty current detectors like 424, performance control from the aircraft higher-level processor, etc. The processor selection signal can be generated in hardware, be a combination of voltage monitoring hardware signals, watch-dog hardware signals and signals generated by error detecting made by the main processor software and/or by a direct command from the higher-level flight control processor.

While the description of the system has been given for electric motors like those disclosed in the cited International patent application No. WO 2002/063760, the reliability enhancements obtained by the redundancy principles shown in FIGS. 1, 4, 5, 9 and 10 can be applied to other brushless motors and systems having more than one motor mechanically coupled in parallel to each other.

While the arrangement described above will dramatically reduce the probability that an electric motor will be in a state where it cannot deliver sufficient torque because of faults in power supply systems, motor control CPUs, power control systems, stator defects or transducer errors, there remains the possibility that an actuator will jam due to faults in common mechanical parts such as a roller nut.

FIG. 11 is a view of an actuator rod 1101 that is connected to a control surface shaft 1102 through an actuator arm 1103 and a actuator rod shaft 1115, a releasable shaft 1104 and a secondary arm 1105.

FIG. 12 is a view of the same actuator rod 1101 and a release device as seen parallel to the control surface shaft 1102. The actuator rod 1101 is connected to the control surface shaft 1102 through the actuator arm 1103. However, the actuator arm is not torsionally rigidly assembled on or attached to the control surface shaft 1102. Instead, there is a bearing 1110 that permits the actuator arm 1103 to rotate in relation to the control surface shaft 1102.

In normal operation, the actuator arm 1103 is torsionally fixed relatively to the control surface shaft 1102 through the releasable shaft 1104, that in the position shown in FIG. 12 connects the actuator arm 1103 to the secondary arm 1105 and another secondary arm 1106. These two secondary arms are torsionally rigidly fixed to the control surface shaft 1102. The releasable shaft 1104 meets bearings like 1113. Advantageously, they may be commercially available permanent glide bearings such as "Permaglide®" from INA Wälzlager. The releasable shaft 1104 has a tapped end 1107 that is movable in the left-right direction as seen in FIG. 12 by turning a tapped nut 1108 that on the outside is formed as a cog wheel. This cog wheel 1108 meets another cog wheel 1109 which is assembled on a planetary gearbox motor unit 1111 with a motor 1114.

The tapped end 1107 of the releasable shaft is kept from rotating by a conventional device not shown, and the cog wheel/tapped nut 1108 is held by some bearing arrangement, not shown.

In many configurations, one control surface is moved by two actuators. In the case of electromechanical actuators, two actuators can easily be set to operate synchronously. Assuming that the actuators are located with a sufficient distance between them, the elasticity of the control surface, such as a wing rudder surface, will absorb the small differences in the movements of the two actuators. This elasticity also permits each one of the two actuators to make small movements in relation to the other actuator. This permits each actuator to check indications of jamming. In the case where jamming is suspected, the actuator can make a minor movement. If a high peak torque does not result in an actuator angular movement, a jam can be assumed to be present.

A position sensor device 1112, not shown in FIG. 11, is used to ensure that the releasable shaft 1104 is in its correct position during flight. It can also be used to make controlled pre-flight movements of the releasable shaft 1104. This can for example be arranged by creating a tension in the control surface shaft 1102 by moving the two actuators in different directions. The resulting torque in the actuator arm 1103 will pass the releasable shaft 1104. The releasable shaft can then be moved for example to the left and right with a movement that turns the cog wheel/tapped nut 1108 at least one full turn. The required current to the motor 1111 can be monitored to verify that the friction in the release system is well within required limits.

A test made using a 14 mm diameter releasable steel shaft with a standard M10 tapping and three 12 mm long arm pieces operating as arms 1105, 1103 and 1106 indicated that at 10 kN force from the actuator arm 1103 to the secondary arms 1105–1106 could be completely released by applying a 2 Nm torque on the cogwheel/tapped nut 1108. (This test seems to put the functionality of the anti-jamming device of the cited U.S. Pat. No. 4,575,027 in doubt. The force provided by a reasonable mass solenoid is far lower that what would be required to move the lock pin of this patent if its actuator was jammed in a position with a high tension on the actuator.)

A disadvantage associated with the implementation shown in FIGS. 11 and 12 is the time required to disengage the releasable shaft 1104. By having two releasable shafts as shown in FIG. 13, the required movement distance is reduced to one third. The tapped ends 1107 can advantageously be inverted so that a common rotational movement of the tapped nuts like 1301 will cause both releasable shafts to move apart. The nuts 1301 can in this case advantageously be cog belt driven by a motor driven shaft, not shown.

Figure 14:
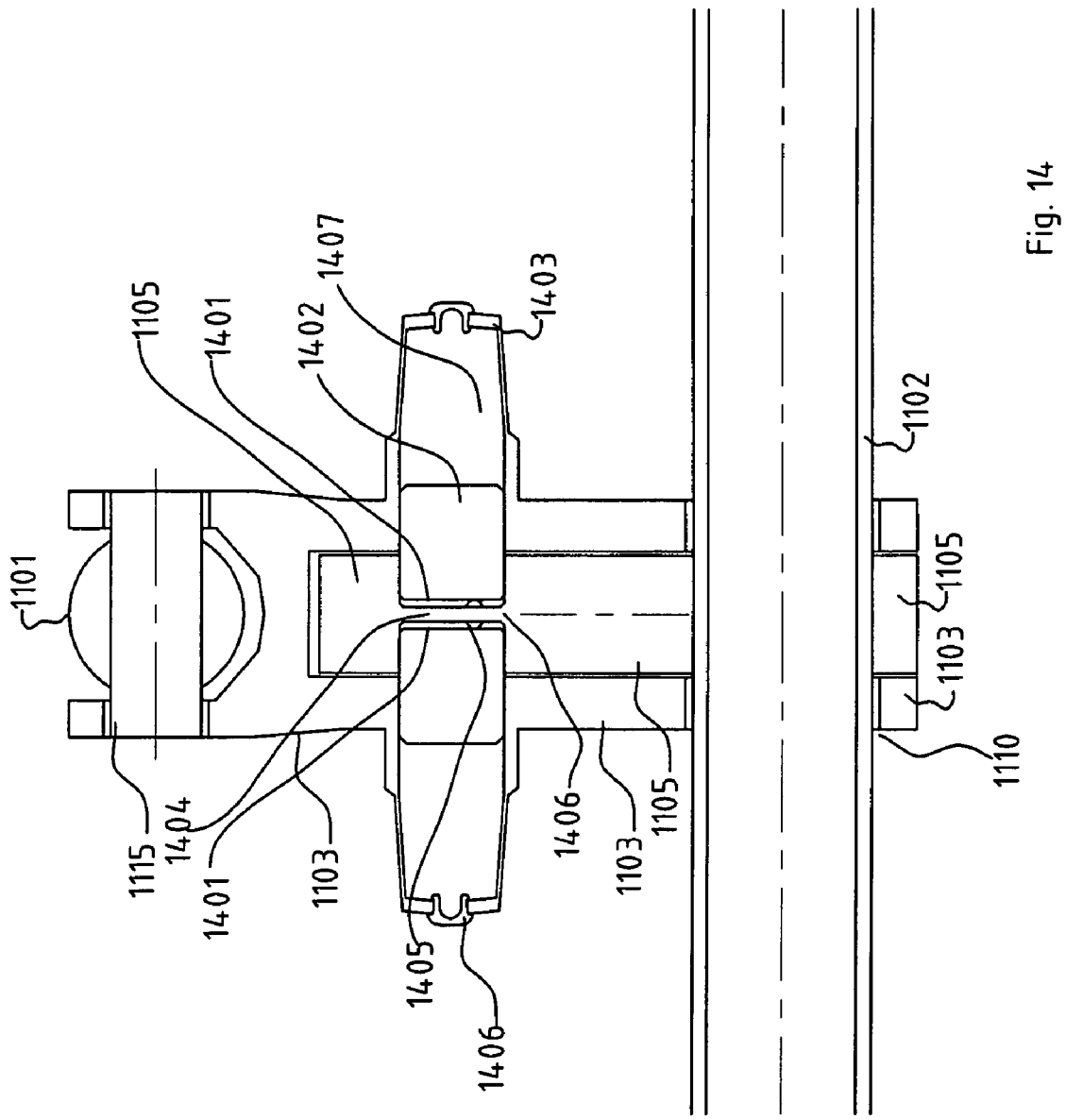
FIG. 14 is a view of a release system having two releasable half shafts with explosive charge driven movement.

FIG. 14 shows a considerably faster arrangement using an explosive charge 1401 inserted between two removable shafts like 1402. When the charge is detonated, the resulting gas pressure will force the removable shafts 1402 to accelerate, moving away from each other. Catch-up devices 1403, also called stoppers, are designed to absorb the energy from the removable shafts 1402 and stop them without bouncing back into the single secondary arm 1105. The explosive charge is divided into two main parts by a central wall 1404. The two main parts of the explosive charge 1401 are ignited by a common detonator, not shown, through a channel 1405, shown more in detail as 1705 in FIG. 17. The catch-up devices 1403 can include a tubular part having e.g. relatively thin walls, the tubular part closed by an end wall. The walls of the tubular part can be somewhat tapering in order to retard the movement of the respective removable shaft 1402. To avoid that the cavities 1407 between the removable shaft and the end wall will be filled with solid dirt, an elastic plug 1406 covers the opening in the end wall intended for releasing the air being compressed by the approach of the removable shaft 1402. Generally, the catch-up devices thus include an air-cushion, i.e. the air in the cavities 1407, or a plastically deformable device, i.e. the tubular portions.

There is considerable experience available on the use of explosive charge actuators in aircraft to release bombs and missiles and in spacecraft and missiles to eject panels and separate rocket stages. There are standards for a lower current that can be used to verify the integrity of cabling and internal detonator wiring without firing the device and a higher current that will certainly detonate the device.

The symmetry of the arrangement will reduce the shocks to the airframe parts created by the explosion. The use of a common detonator will cause the two removable shafts to initiate their movements practically simultaneously. The intermediate center wall 1404 will reduce the risk that differences in friction will cause one of the two removable shafts 1402 to use most of the power from the explosive charge. This could in a worst case leave the slower part 1402 still engaged in part 1105. With simultaneous start time and equal accelerations, almost all the force required to stop the moving removable shafts 1402 will be internal to the structure 1403–1103.

Figure 15:
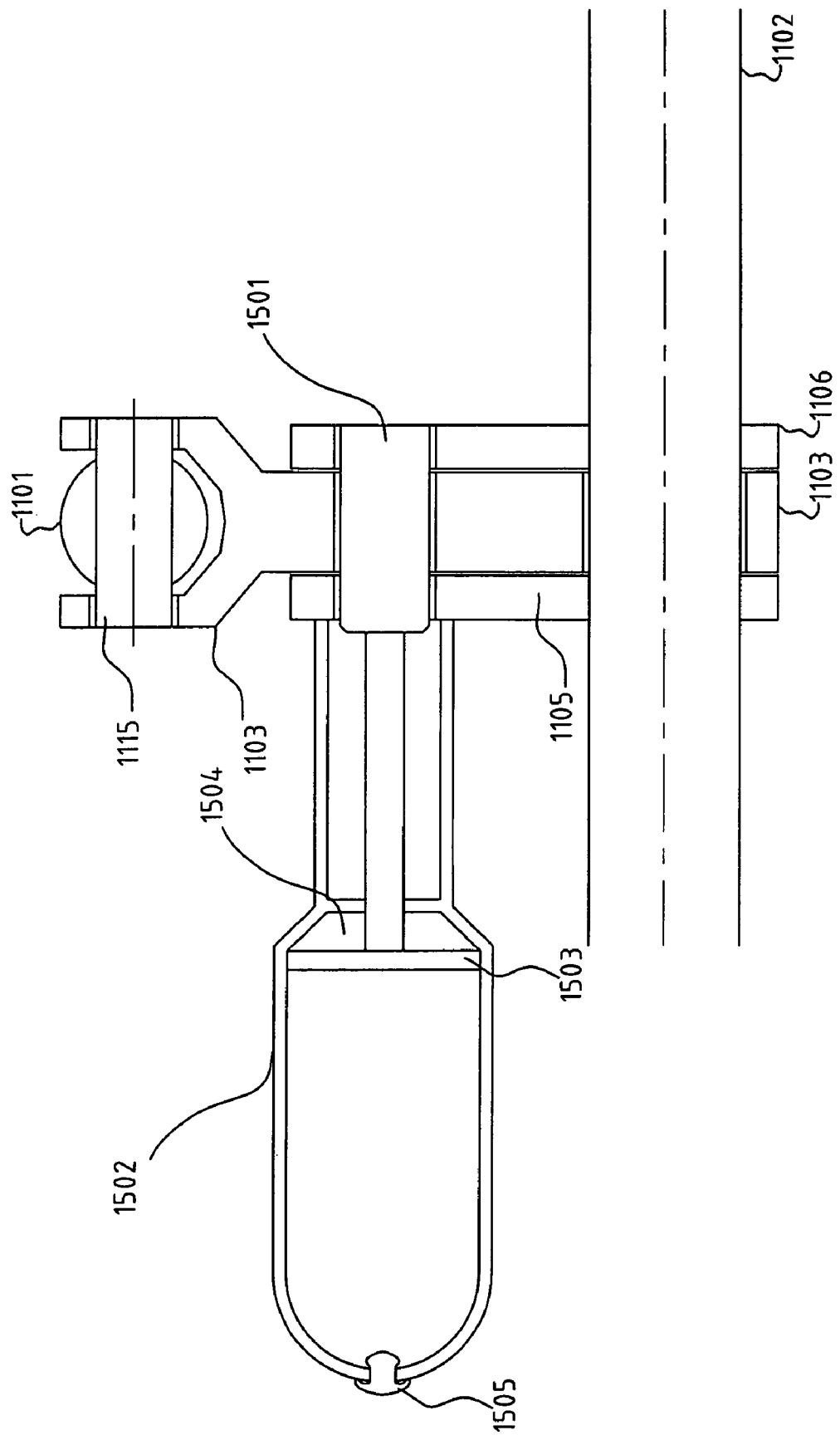
FIG. 15 is a view of a release system having a releasable shaft with an external explosive charge driven movement.

FIG. 15 shows a release system having a releasable shaft 1501 with an external explosive charge driven movement. The releasable shaft 1501 is connected to a piston 1503 in a cylinder 1502. To release the releasable shaft 1501, an explosive charge 1504 is exploded, thus forcing the piston to move to the left in FIG. 15. To avoid a possible recoil, a pressure released device shown as 1505 can be arranged so that the air otherwise kept on the left side or the piston 1503 can escape. By using experience and designs from safety belt tensioners which has been used in millions during many years, the reliability of the ignition device for the explosive charge can be kept high.

In the embodiments shown, the actuator arm 1103 is keeping the actuator rod 1101 in a position where it cannot interfere with the free movement of the control surface shaft 1102 and the parts like 1105 that rotate with the control surface shaft 1102. If the actuator rod 1101 can be moved away from the path required for the arm/arms 1105, 1106 to move freely, the actuator rod shaft 1115 can be made releasable. The actuator arm 1103 can then be rigidly fixed to the control surface shaft 1102 and the secondary arms 1105, 1106 can be eliminated.

Figure 16:
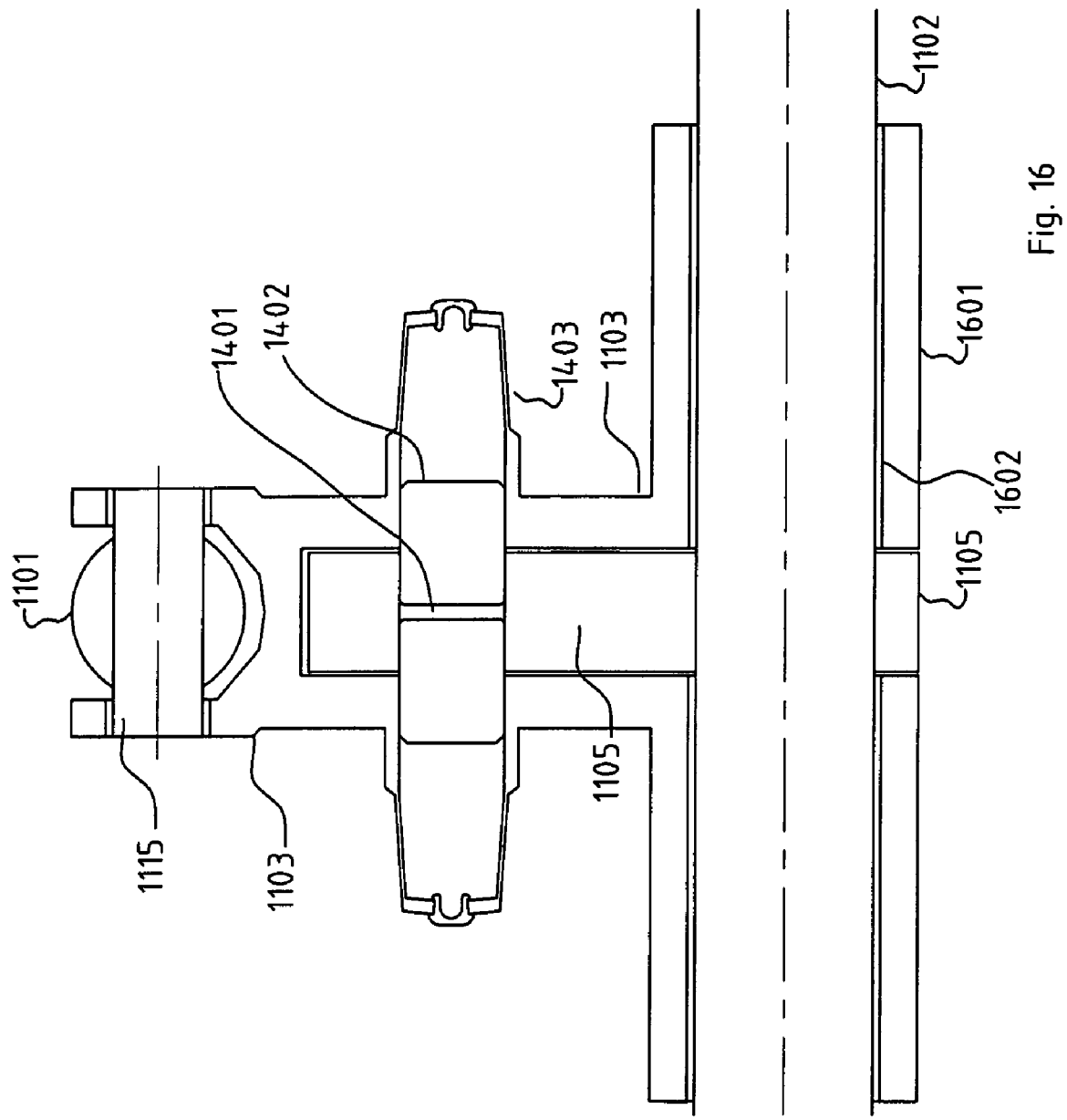
FIG. 16 is a view showing a release system having two releasable half shafts with an internal explosive charge driven movement and a friction damper device.

The preceding embodiments have been designed to have a low friction between the control surface shaft 1102 and the actuator arm 1103 in the released state. This is suitable for systems having two actuators operating on the same control surface. FIG. 16 shows a release system similar to that of FIG. 14 but which has a design intended to provide a high friction between the primary arms 1103 and the secondary arm 1105 or, as shown, the control surface shaft 1102. In the embodiment shown, this is arranged by having tubes like 1601 attached to the primary arms 1103. By adding a suitable friction material 1602 and selecting a suitable tolerance between the bore in the friction material 1602 and the control surface shaft 1102, a suitable friction torque can be obtained in the released state between the control surface shaft 1102 and the primary arms 1601. This is suitable when a control surface has only one actuator. As the condition for entering the released state is that the actuator is jammed, the actuator rod 1101 will be in a fixed position thus locking the primary arms 1601. Any movement of the control surface shaft 1102 must therefore overcome the friction between the surfaces 1602 and the surface of the control surface shaft 1102. This is suitable to dampen oscillation movements that can appear on free moving control surfaces. The friction device shown has a cylindrical shape. Many alternative friction systems can be used, such as having a stack of spring compressed plates, odd number plates fixed against the control surface shaft 1102 and even number plates fixed against the actuator arms like 1103.

Figure 17:
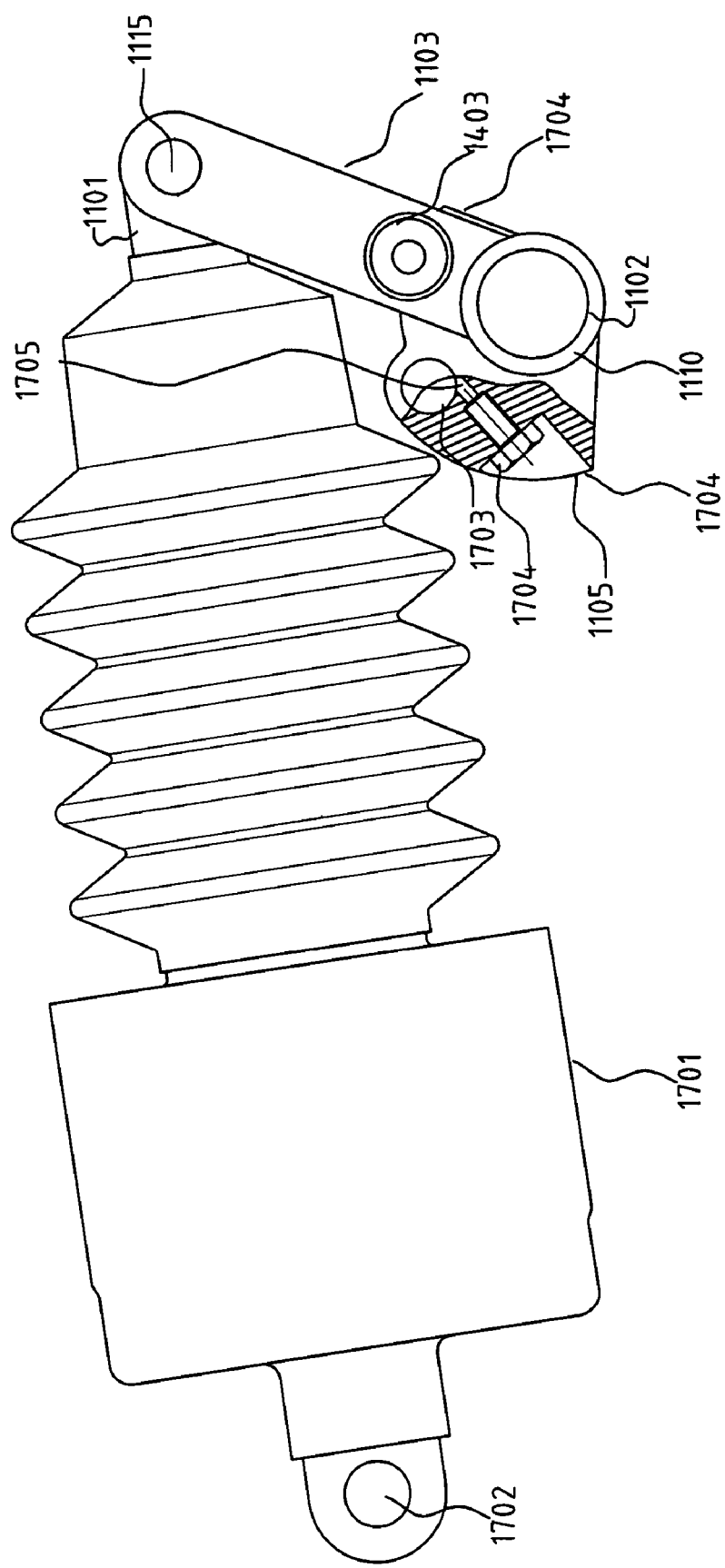
FIG. 17 shows an actuator connected to the releasable arm shown in FIG. 14.

FIG. 17 shows an actuator connected to the releasable arm shown in FIG. 14. An actuator 1701 is assembled to the airframe in fixtures, not shown, meeting the ear 1702. FIG. 17 shows a situation when the actuator 1701 has jammed in the extreme clock-wise position of the control surface shaft 1102. A partial section of FIG. 17 shows a detonator 1704 that has ignited the charge shown in FIG. 14 through the cannel 1705. The detonator can be activated be cables, not shown. The shaft of the control surface has then been moved to its extreme counter clock-wise position, for example by another actuator mounted to act on the same shaft 1102. Therefore, the secondary actuator arm 1105 is moved some 60° in relation to the actuator arm 1103 and the opening 1703 that during normal, not jamming operation is aligned with and covered by the catch-up device 1403, is fully visible. There are two ears 1704 on the secondary arm 1105 to ensure that the secondary arm can move freely without jamming against the actuator arm 1103. The actuator arm 1103 keeps the actuator in a position where it cannot interfere with the movements of the secondary arm 1105.

Figure 18:
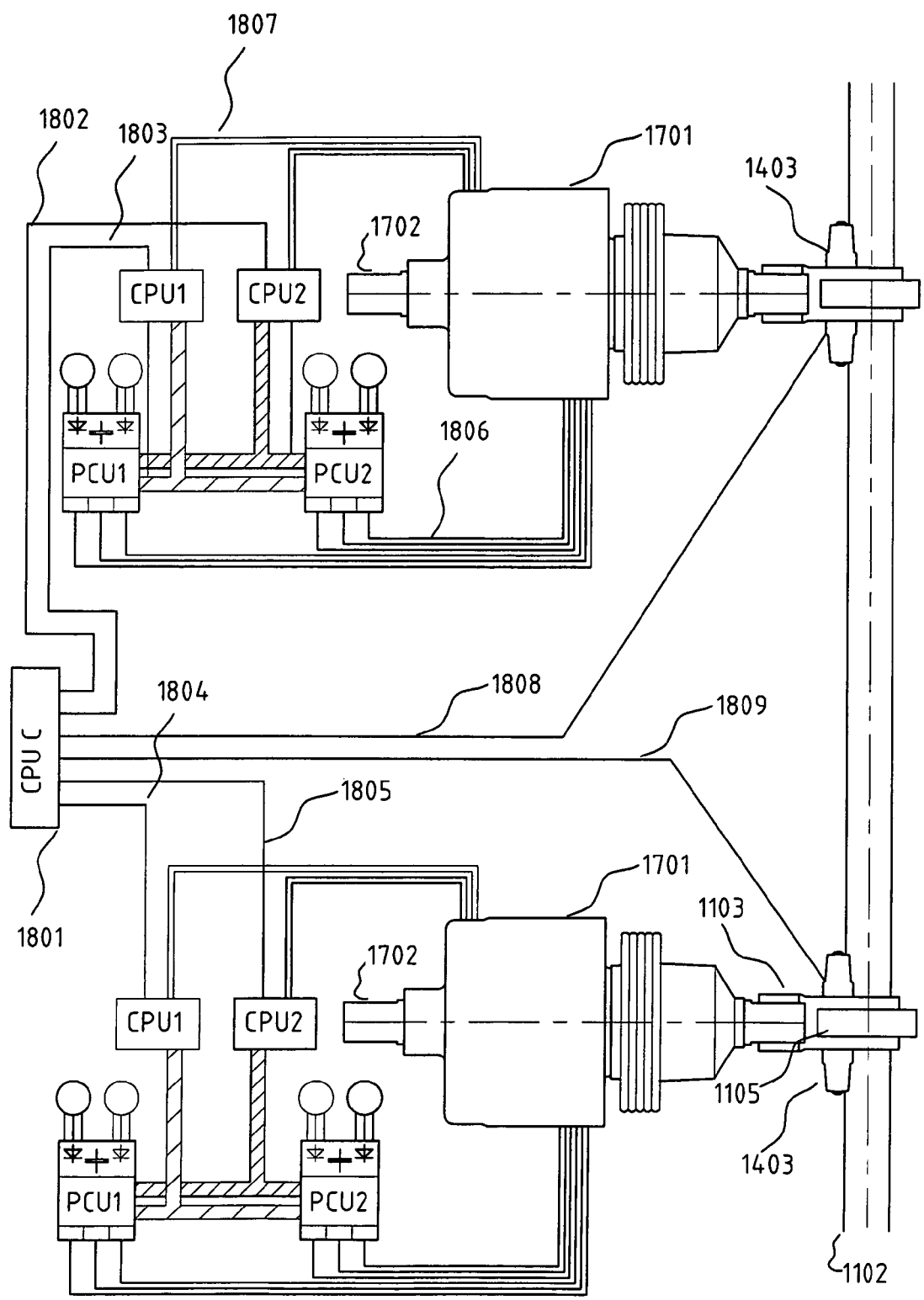
FIG. 18 shows two actuators connected to a common control surface shaft by releasable arms as shown in FIG. 14 and its control system.

FIG. 18 shows a control and actuator system for a control surface, not shown. There are two actuators like 1701 connected to a common control surface shaft 1102 through releasable arms 1103, 1105. The actuators are connected to the airframe, not shown, by ears 1702 and are shown with their minimum stroke; the actuator in FIG. 17 is shown with its maximum stroke.

There is a common higher-level control processor 1801 (CPU C) that communicates with, or is a part of, the central flight processor, not shown. Each actuator is connected to a control system like those shown in FIGS. 1 and 4. Only the main outlines of these systems are shown in FIG. 18. There are communication channels 1802–1805 corresponding to the channels 121 and 122 in FIG. 1, stator coil connections 1806 arranged in six sets, each set corresponding to 107–109 of FIG. 1, a position transducer connection 1807 and the power supplies PS1 and PS2. Other details such as the CPU selection lines 123 or central position feedback 124 from each actuator to the CPU C are omitted in order to reduce the complexity of the picture. Lines 1808 and 1809 permit the CPU C to mechanically disconnect jammed actuators 1701.

As a single actuator jamming is not a catastrophic failure, smaller lead angle roller screws can be used. This permit lower motor torque, lower actuator mass and lower heat losses in the motors.

The very high fault tolerance of the electronic and motor stator parts make a total loss of motor torque very unlikely. This will make dependence of the absence of self-retention in the roller screw-nut system equally unlikely, again permitting small lead angle roller screws.

The actuator mechanic components and electronic circuits must be dimensioned to be capable of delivering the required performance with only one actuator active. In almost all cases, both actuators will be active, permitting each other to work at maybe half its designed capacity. This will cause very much longer expected life time for mechanical bearings and roller screw systems. It will also cause low stresses on electronic components and motor parts thus permitting operation at a lower temperature and a longer MTBF.

Figure 19:
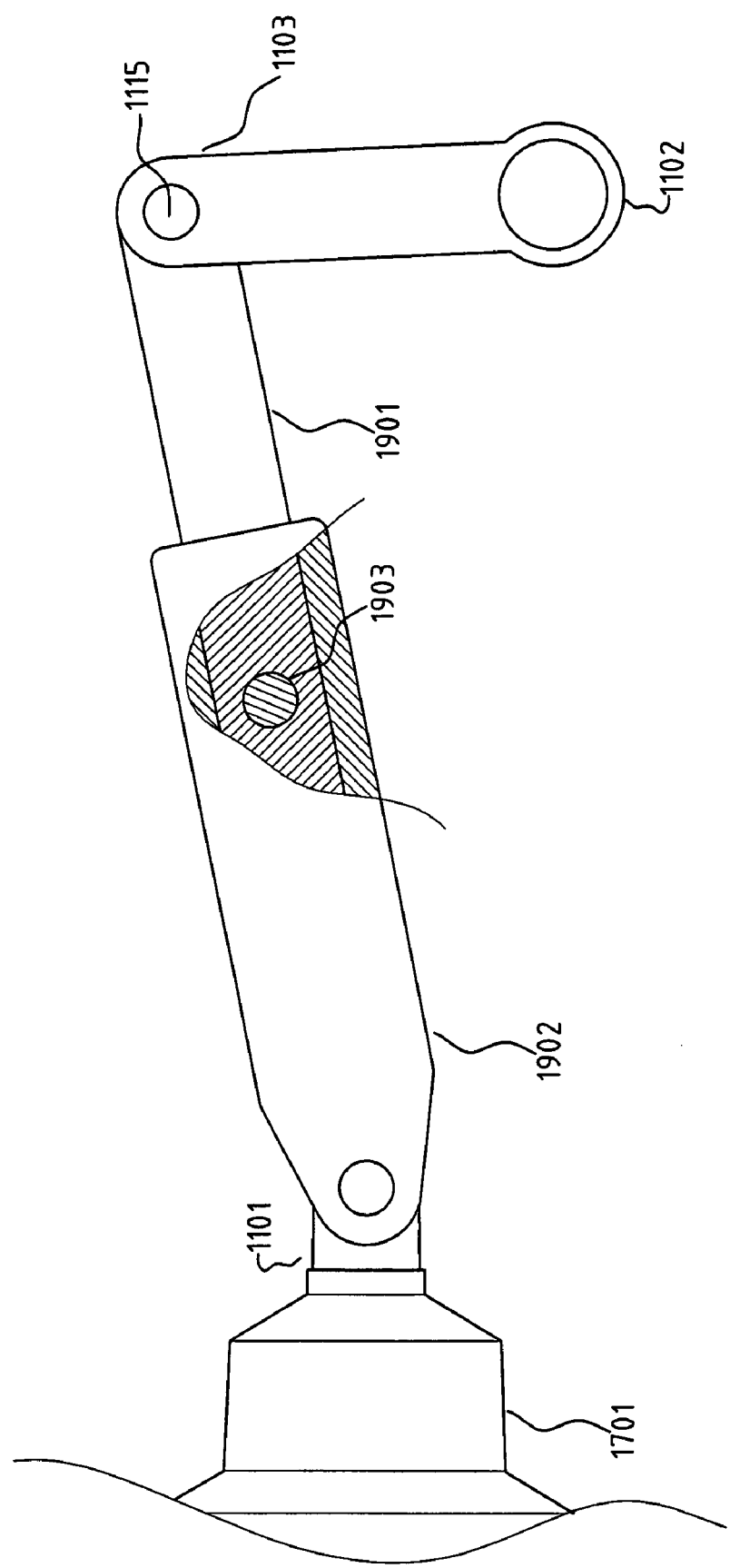
FIG. 19 is a view of a telescopic link arm having a releasable joining shaft.

The removable shafts shown are inserted in the arm between the actuator ear 1101 and the control surface shaft 1102, permitting the arm parts 1103 and 1105 to rotate in relation to each other when the removable shafts have been removed. If other linkage arrangements are used, the same basic principle including removable shafts can be used. FIG. 19 shows a telescopic arm replacing a stiff linkage arm. The two telescopic parts 1901 and 1902 are locked to each other using a removable shaft 1903 but are permitted to slide in relation to each other if the removable shaft is removed.

As is obvious for those skilled in the art, the embodiments shown in FIGS. 11–19 can be modified in many ways.

There are many alternative ways to move the removable shafts like 1402. While only systems driven by a motor driven screw and by an explosive charge have been shown, it is obvious that alternative means using rack and pinion, electromechanical spools, for example as sold by G&H Technology Inc., Shape Memory Metal devices, High Output Paraffin devices, for example as sold by Starsys Research Corp., gas pressure from compressed gas cartridges, in principle similar to those used in $CO_2$ guns or cork removal tools, etc. could be used.

The removable shafts shown are inserted in the arm between the actuator ear 1101 and the control surface shaft 1102, permitting the arm parts 1103 and 1105 to rotate in relation to each other when the removable shafts have been removed. If other linkage arrangements are used, the same basic principle of removable shafts can be used. A stiff linkage arm can be replaced with a telescopic arm where the two telescopic parts are locked to each other using a removable shaft/removable shafts but are permitted to slide in relation to each other when the removable shaft/s/have been removed.

The basically force balanced device shown in FIG. 14 could be used in other applications in the aerospace field to release loads.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. An actuator and movement linkage system for moving a load in relation to a carrying structure, including
    an electric motor system,
    an actuator device connectable or connected to the load to move the load, the actuator device connected to the electric motor system to be driven thereby,
    transfer units provided for mechanically connecting the actuator device to move the load,
    fault tolerant and release devices both in the electrical motor system and the actuator device and arranged to make the actuator and movement linkage system fault tolerant to at least single faults in other parts of the actuator and movement linkage system,
    wherein the electrical motor system includes an electric motor having stator windings, power switches for supplying current to the motor windings, power control units, a rail voltage system including voltage rails, rail voltage capacitors connected between the voltage rails, motor control processors,
    the fault tolerant and release devices include
        that at least two power sources and a connecting device are provided for connecting all of the power control units to an operational power source selected among said at least two power sources for making the actuator and movement linkage system tolerant against a power source fault,
        that the rail voltage capacitors include a plurality of capacitors connected in series with each other, the capacitors in said plurality of capacitors rated to withstand the voltage appearing if one of the capacitors is short-circuited for making the actuator and movement linkage system tolerant against short circuit failures in the rail voltage capacitors,
        that at least six motor stator windings or winding groups without any direct metallic contact between the windings or winding groups are arranged for making the actuator and movement linkage system tolerant against motor winding failures and against power switch failures,
        that the power switches are arranged in a plurality of power switch units connected to respective ones of the motor windings for controlling the amount of electrical current passing through the motor windings, and hence the torque delivered by or derived from said respective windings, for making the actuator and movement linkage system tolerant against loss of generated torque by failures in the power switches,
        extra switches that in case of short-circuit in the power switches or in the rail voltage system are arranged to break the current loop that otherwise would have been created by one of the motor windings, power switch unit diodes and a short-circuited device, and that the power switches are arranged in a plurality of power switch units connected to respective ones of the motor windings for controlling the amount of electrical current passing through the respective motor windings, and hence the torque delivered by or derived from said respective motor windings, for making the actuator and movement linkage system tolerant against unintended braking torque caused by short-circuits in the power switches or short-circuits over the rail voltage system,
        that a plurality of motor control processors and devices to force all power control units to accept commands from one and the same, not faulty, motor control processor are arranged for making the actuator and movement linkage system tolerant against faults in motor control processors and for eliminating possible conflicts between the motor control processors, and removable release devices joining or locking the transfer units and arranged to be removed in the case of a fault, allowing the transfers unit to move at least to some extent freely in relation to each other for making the actuator and movement linkage system tolerant against jamming in moving mechanical parts of the actuator device.

2. An actuator and movement linkage system for moving a load in relation to a carrying structure, including an electric motor system, an actuator device connectable or connected to the load to move the load, the actuator device connected to the electric motor system to be driven thereby, fault tolerant and release devices both in the electrical motor system and the actuator device and arranged to make the actuator and movement linkage system fault tolerant to at least single faults in other parts of the actuator and movement linkage system.

3. The actuator and movement linkage system of claim 2, wherein the fault tolerant and release devices are arranged to allow, in the case of a fault in a component of the actuator and movement linkage system, that the electric motor system still is capable of driving the actuator device.

4. The actuator and movement linkage system of claim 2, wherein the fault tolerant and release devices include electrical fault tolerant and release devices included in the electric motor system, the electrical fault tolerant and release devices connected to or in other electric components in the electric motor system and arranged to allow, in the case of a fault in a component of the electric motor system, that the electric motor system still is capable of driving the actuator device.

5. The actuator and movement linkage system of claim 2, wherein the fault tolerant and release devices include mechanical release device connected between the actuator device and the load, the mechanical release device arranged to allow, in the case of a fault in a component of the electric motor system or in the actuator device, the actuator device to move freely.

6. The actuator and movement linkage system of claim 2, wherein the electrical motor system includes power control units and the fault tolerant and release devices include that at least two power sources and a connecting device are provided for connecting all of the power control units to an operational power source selected among said at least two power sources for making the actuator and movement linkage system tolerant against a power source fault.

7. The actuator and movement linkage system of claim 2, wherein the electrical motor system includes voltage rails and rail voltage capacitors connected between the voltage rails and the fault tolerant and release devices include that the rail voltage capacitors include a plurality of capacitors connected in series with each other, the capacitors in said plurality of capacitors rated to withstand the voltage appearing if one of the capacitors is short-circuited for making the actuator and movement linkage system tolerant against short circuit failures in rail voltage capacitors.

8. The actuator and movement linkage system of claim 2, wherein the electrical motor system includes an electric motor having stator winding and the fault tolerant and release devices include that at least six motor stator windings or winding groups without any direct metallic contact between the windings or winding groups are arranged for making the actuator and movement linkage system tolerant against motor winding failures.

9. The actuator and movement linkage system of claim 2, wherein the electrical motor system includes motor windings and stator current switches for supplying current to the motor windings and the fault tolerant and release devices include that at least six motor stator windings or winding groups without any direct metallic contact between the windings or winding groups are arranged for making the actuator and movement linkage system tolerant against power switch failures.

10. The actuator and movement linkage system of claim 2, wherein the electrical motor system includes motor windings and power switches and the fault tolerant and release devices include that the power switches are arranged in a plurality of power switch units connected to respective ones of the motor windings for controlling the amount of electrical current passing through the motor windings, and hence the torque delivered by or derived from said respective windings, for making the actuator and movement linkage system tolerant against loss of generated torque by failures in the power switches.

11. The actuator and movement linkage system of claim 2, wherein the electrical motor system includes motor windings, power switches and a rail voltage system and the fault tolerant and release devices include extra switches that in case of a short-circuit in the power switches or in the rail voltage system are arranged to break the current loop that otherwise would have been created by one of the motor windings, power switch unit diodes, and a short-circuited device, and that the power switches are arranged in a plurality of power switch units connected to respective ones of the motor windings for controlling the amount of electrical current passing through the respective motor windings, and hence the torque delivered by or derived from said respective windings, for making the actuator and movement linkage system tolerant against unintended braking torque caused by short-circuits in the power switches or short-circuits over the rail voltage system.

12. The actuator and movement linkage system of claim 2, wherein the electrical motor system includes motor control processors and power control units and the fault tolerant and release devices include that a plurality of motor control processors and devices to force all power control units to accept commands from one and the same, not faulty, motor control processor are arranged for making the actuator and movement linkage system tolerant against faults in motor control processors.

13. The actuator and movement linkage system of claim 2, wherein the fault tolerant and release devices include that a plurality of motor control processors and devices to force all power control units to accept commands from one and the same, not faulty, motor control processor for eliminating possible conflicts between the motor control processors.

14. The actuator and movement linkage system of claim 2, wherein transfers units are provided for mechanically connecting the actuator device to move the load, and the fault tolerant and release devices include removable release devices joining or locking the transfer units and arranged to be removed in the case of a fault, allowing the transfers unit to move at least to some extent freely in relation to each other for making the actuator and movement linkage system tolerant against jamming in moving mechanical parts of the actuator device.

15. The actuator and movement linkage system of claim 2, wherein the fault tolerant and release devices are arranged to allow, in the case of a fault in a component of the actuator and movement linkage system, the electric motor system to permit the actuator device to move freely.

16. The actuator and movement linkage system of claim 2, wherein the fault tolerant and release devices are arranged to allow, in the case of a fault in a component of the actuator and movement linkage system, the electric motor system to permit the actuator device not to influence the movement of the load.

17. The actuator and movement linkage system of claim 2, wherein the fault tolerant and release devices are arranged to allow, in the case of a fault in a component of the actuator and movement linkage system, the electric motor system to permit the actuator device not to prevent the movement of the load.

18. The actuator and movement linkage system of claim 2, wherein the fault tolerant and release devices are arranged to allow, in the case of a fault in a component of the actuator and movement linkage system, the electric motor system to permit the actuator device not to obstruct the movement of the load.

19. The actuator and movement linkage system of claim 2, wherein the fault tolerant and release devices are arranged to allow, in the case of a fault in a component of the actuator and movement linkage system, the electric motor system to permit the actuator device not to delay the movement of the load.

20. The actuator and movement linkage system of claim 2, wherein the fault tolerant and release devices are arranged to allow, in the case of a fault in a component of the actuator and movement linkage system, the electric motor system to permit the actuator device not to retard the movement of the load.

21. The actuator and movement linkage system of claim 2, wherein the fault tolerant and release devices are arranged to allow, in the case of a fault in a component of the actuator and movement linkage system, that the electric motor system allows the actuator device not to make the movement of the load significantly more difficult than before the occurrence of the fault.

22. The actuator and movement linkage system of claim 2, wherein the fault tolerant and release devices are arranged to allow, in the case of a fault in a component of the actuator and movement linkage system, the actuator device to move freely.

23. The actuator and movement linkage system of claim 2, wherein the fault tolerant and release devices are arranged to allow, in the case of a fault in a component of the actuator and movement linkage system, the actuator device not to significantly influence the movement of the load.

24. The actuator and movement linkage system of claim 2, wherein the fault tolerant and release devices include electrical fault tolerant and release devices included in the electric motor system, the electrical fault tolerant and release devices connected to or in other electric components in the electric motor system and arranged to allow, in the case of a fault in a component of the electric motor system, that the electric motor system allows the actuator device to move freely.

25. The actuator and movement linkage system of claim 2, wherein the fault tolerant and release devices include electrical fault tolerant and release devices included in the electric motor system, the electrical fault tolerant and release devices connected to or in other electric components in the electric motor system and arranged to allow, in the case of a fault in a component of the electric motor system, the electric motor system to permit the actuator device not to influence the movement of the load.

26. The actuator and movement linkage system of claim 2, wherein the fault tolerant and release devices include electrical fault tolerant and release devices included in the electric motor system, the electrical fault tolerant and release devices connected to or in other electric components in the electric motor system and arranged to allow, in the case of a fault in a component of the electric motor system, the electric motor system to permit the actuator device not to prevent the movement of the load.

27. The actuator and movement linkage system of claim 2, wherein the fault tolerant and release devices include electrical fault tolerant and release devices included in the electric motor system, the electrical fault tolerant and release devices connected to or in other electric components in the electric motor system and arranged to allow, in the case of a fault in a component of the electric motor system, the electric motor system to permit the actuator device not to obstruct the movement of the load.

28. The actuator and movement linkage system of claim 2, wherein the fault tolerant and release devices include electrical fault tolerant and release devices included in the electric motor system, the electrical fault tolerant and release devices connected to or in other electric components in the electric motor system and arranged to allow, in the case of a fault in a component of the electric motor system, the electric motor system to permit the actuator device not to delay the movement of the load.

29. The actuator and movement linkage system of claim 2, wherein the fault tolerant and release devices include electrical fault tolerant and release devices included in the electric motor system, the electrical fault tolerant and release devices connected to or in other electric components in the electric motor system and arranged to allow, in the case of a fault in a component of the electric motor system, the electric motor system to permit the actuator device not to retard the movement of the load.

30. The actuator and movement linkage system of claim 2, wherein the fault tolerant and release devices include electrical fault tolerant and release devices included in the electric motor system, the electrical fault tolerant and release devices connected to or in other electric components in the electric motor system and arranged to allow, in the case of a fault in a component of the electric motor system, that the electric motor system allows the actuator device not to make the movement of the load significantly more difficult than before the occurrence of the fault.

31. The actuator and movement linkage system of claim 2, wherein the fault tolerant and release devices include a mechanical release device connected between the actuator device and the load of the actuator device, the mechanical release device arranged to allow, in the case of a fault in a component of the electric motor system or in the actuator device, that the actuator does not to significantly influence the movement of the load.

32. The actuator and movement linkage system of claim 2, wherein the fault tolerant and release devices include a mechanical release device connected in an output unit of the actuator device, the mechanical release device arranged to allow, in the case of a fault in a component of the electric motor system or in the actuator device, the actuator device to move freely.

33. The actuator and movement linkage system of claim 2, wherein the fault tolerant and release devices include a mechanical release device connected in an output unit of the actuator device, the mechanical release device arranged to allow, in the case of a fault in a component of the electric motor system or in the actuator device, that the actuator does not to significantly influence the movement of the load.

34. A fault tolerant electric motor system for driving a mechanical load including:
   at least one electric motor having at least one stator,
   each of said at least one stator having at least one rotor coupled to a mechanical load for driving the mechanical load,
   coils or windings of a plurality of electrical motor phases, the coils or windings assembled in said at least one stator,
   a plurality of motor control processors for issuing commands and receiving data,
   a plurality of power control units for controlling electric current in the coils or windings of the plurality of electrical motor phases, each of the power control units connected to the coils or windings of an individual subset of the electrical motor phases for driving currents in said coils or windings,
   each of the power control units arranged to be connectable to anyone of the motor control processors to receive commands from and provide data, to the motor control processors,
   a switch or switching means for forcing all of the power control units to be all, jointly or commonly, controlled by any single one of the motor control processors, and
   a failure detector for identifying failure of one of the motor control processors and, in the case where a failure is identified, for forcing all of the power control units to be controlled by another of the motor control processors.

35. The fault tolerant electric motor system of claim 34, wherein each of the power control units includes:
   a power switch unit including power switches, the power switch unit connected to the coils or windings of said individual subset of the electrical motor phases,
   the power switches being rendered on and off in response to commands from that one of motor control processors that controls the power switch units, for controlling the amount of electrical current passing through said coils or windings, and hence the torque delivered by or derived from said coils or windings.

36. The fault tolerant electric motor system of claim 35, wherein each of power control units has the power switches of its power switch unit connected as at least one H-bridge for each of the electrical motors phases included in said individual subset of the electrical motor phases.

37. The fault tolerant electric motor system of claim 36, wherein each of the at least one H-bridge includes four power switches.

38. The fault tolerant electric motor system of claim 34, wherein the at least one electrical motor has an output device connectable to an actuator.

39. The fault tolerant electric motor system of claim 34, wherein the coils or windings of all of the electrical motor phases are assembled in one stator.

40. The fault tolerant electric motor system of claim 34, wherein for each of the motor control processors individual detectors are connected in the path of electrical power or electrical current to the coils or windings of the electrical motor phases.

41. The fault tolerant electric motor system of claim 40, wherein the individual detectors for one of the motor control processors are separate or insulated from the individual detectors for another one of the motor control processors.

42. The fault tolerant electric motor system of claim 34, wherein the plurality of motor control processors are arranged to issue motor current switches on-time commands.

43. The fault tolerant electric motor system of claim 34, wherein the plurality of motor control processors are arranged to receive sensed values of parameters.

44. The fault tolerant electric motor system of claim 34, wherein each of the power control units is arranged to provide sensed values of parameters to the motor control processors.

45. The fault tolerant electric motor system of claim 34, wherein each of the power control units includes:
   a power switch unit including power switches, the power switch unit connected to the coils or windings of said individual subset of the electrical motor phases,
   the power switches being rendered on and off in response to commands from that one of motor control processors that controls the power switch units, for controlling the amount of electrical current passing through said coils or windings to make the torque delivered by or derived from said coils or windings being regulated by the on-time of the power switches.

46. The fault tolerant electric motor system of claim 34, wherein the at least one electrical motor has an output shaft connectable to an actuator.

47. The fault tolerant electric motor system of claim 34, wherein for each of the motor control processors individual detectors are connected in each of the power control units and hence in the path of electrical power or electrical current to the coils or windings of the electrical motor phases.

48. A fault tolerant electric motor system for driving a mechanical load including:
   at least one electric motor having coils or windings of a plurality of electrical motor phases,
   a plurality of power control units for controlling electric current in the coils or windings of the plurality of electrical motor phases, each of the power control units connected to the coils or windings of an individual subset of the electrical motor phases for driving currents in said coils or windings and each of the power control units arranged to receive, for controlled supply to the coils or windings, electrical power or electrical current from anyone of a plurality of electrical power sources or electrical current sources,
   a first switch unit for forcing each of the power control units to normally or in a first basic state take electrical power or electrical current from an assigned or preferred one of the electrical power sources or electrical current sources, and
   a second switch unit for forcing each of the power control units to take electrical power or electrical current from a non-preferred one of the electrical power sources or electrical current sources in a second exceptional case or in the case where the assigned or preferred one of the electrical power sources or electrical current sources fails.

49. The fault tolerant electric motor system of claim 48, in which the said first switch unit is a set of diodes which will insulate a failing preferential power source from the power control unit in case a non-preferential electrical power source or electrical current source is connected by said second switch unit and provides the power control unit with a higher voltage than what is provided by the preferential electrical power source or electrical current source.

50. The fault tolerant electric motor system of claim 48, in which the said first switch unit and the said second switch unit both are sets of diodes which will reduce or eliminate the current taken from a lower voltage power source to the power control unit and increase the current taken from a higher voltage power source to the power control unit.

51. A fault tolerant electric motor system for driving a mechanical load including:
   at least one electric motor having coils or windings of a plurality of electrical motor phases,
   terminals to receive electrical power or electrical current,
   a power switch unit including power switches, the power switch unit connected to the coils or windings of the electrical motor phases, and
   a capacitive DC power storage or decoupling unit to which the said power switch unit is connected,
      the capacitive DC power storage or decoupling unit including a plurality of serially connected groups of parallel connected capacitors, and
      the voltage rating of the capacitors permitting them to withstand the total voltage of the capacitive DC power storage or decoupling unit even if one of the said group of parallel connected capacitors is short-circuited.

52. The fault tolerant electric motor system of claim 51, further including voltage detectors connected to measure the voltage over the whole capacitive DC power storage or decoupling unit and the voltage over a subset of the serially connected groups of parallel connected capacitors.

53. A fault tolerant electric motor system for driving a mechanical load including:
   at least one electric motor having coils or windings of a plurality of electrical motor phases,
   terminals to receive AC electrical power or electrical current,
   a rectifier unit to convert received AC electrical power or electrical current to DC electrical power or electrical current, and
   an averaging unit coupled to the rectifier unit for receiving the converted DC electrical power or electrical current for averaging or smoothing it, the averaging unit including a plurality of serially connected groups of parallel connected capacitors
   the voltage rating of the capacitors permitting them to withstand the total voltage of the averaging unit even if one of the said group of parallel connected capacitors is short-circuited.

54. The fault tolerant electric motor system of claim 53, further including voltage detectors connected to measure the voltage over the whole averaging unit and the voltage over a subset of the serially connected groups of parallel connected capacitors.

55. A fault tolerant electric motor system for driving a mechanical load including:
   at least one electric motor having coils or windings of a plurality of electrical motor phases,
   terminals to receive electrical power or electrical current,
   a power switch unit including power switches, the power switch unit connected to the coils or windings of the electrical motor phases, and
   a capacitive DC power storage or decoupling unit to which the said power switch unit is connected,
      the capacitive DC power storage or decoupling unit including a plurality of in parallel connected groups of serially connected capacitors, and
      the voltage rating of the capacitors permitting them to withstand the total voltage of the capacitive DC power storage or decoupling unit even if one of the said group of parallel connected capacitors is short-circuited.

56. A fault tolerant electric motor system for driving a mechanical load including:
   at least one electric motor having coils or windings of a plurality of electrical motor phases,
   power switch units connected to respective ones of the coils or windings for controlling the amount of electrical current passing through the coils or windings of the respective one of the electrical motor phases, and hence the torque delivered by or derived from said respective coils or windings,
   at least one switch connected in series with coils or windings of each of the electrical motor phases,
   the at least one switch element arranged to always be in a conducting or closed state during faultless operation of that one of the power switch units controlling the electrical current for the coils or windings of that one of the electrical motor phases to which the at least one switch element is connected, and
   setting means for setting the at least one switch element in an insulating or open state if one of the switches in that one of the power switch unit that is connected to that one of the electrical motor phases to which the at least one switch element is connected enters a permanent on-state or a permanent conducting or closed state.

57. The fault tolerant electric motor system of claim 56, wherein
   the at least one switch element includes a current sensitive fuse, and
   the setting means for setting the at least one switch element is an electrical current having a sufficient intensity and caused by the length of the on-time of one of power switches included in said that one of the power switch units.

58. The fault tolerant electric motor system of claim 56, wherein
   the at least one switch element includes an electrical relay, and
   the setting means for setting the at least one switch element is an electrical current through a coil of the relay.

59. The fault tolerant electric motor system of claim 56, wherein
   the at least one switch element includes a temperature sensitive fuse in thermal contact with at least one of the coils or windings of said that one of the electrical motor phases, and
   the setting means for setting the at least one switch element is an electrical current having a sufficient intensity and caused by the length of the on-time of one of power switches included in said that one of the power switch units.

60. The fault tolerant electric motor system of claim 56, wherein
   the at least one switch element includes a temperature sensitive fuse in close thermal contact with heating means;
   the setting means for setting the at least one switch element is an electrical current causing the heating means to increase the temperature of the temperature sensitive fuse to surpass the trip temperature of the temperature sensitive fuse.

61. The fault tolerant electric motor system of claim 56, wherein the power switch units are arranged to control the amount of electrical current passing through the coils or windings of the respective one of the electrical motor phases to regulate the torque delivered by or derived from said respective coils or windings by the on-time of power switches included in the power switch units.

62. A fault tolerant actuator system including:
   a primary actuator, the length of which can be changed by a control signal and which is connectable to a load,
   a plurality of transfer units to transform the change of the length of the primary actuator to desired movements of the load,
   at least one removable element joining two of the transfer units, the at least one removable element arranged to force said two of the transfer units to move synchronously when the primary actuator is operational, and
   a release device arranged to move the at least one removable element from a first position forcing said two of the transfer units to move synchronously to a second position not forcing said two of the transfer units to move synchronously.

63. The fault tolerant actuator system of claim 62, wherein the release device includes an electric motor and a mechanical transmission for moving the release device.

64. The fault tolerant actuator system of claim 62, wherein the release device includes a pyrotechnic or explosive charge.

65. The fault tolerant actuator system of claim 64, further including a stopper or catch-up device, for stopping the movement of the removable device in such a way that the removable device will not damage parts of the fault tolerant actuator system and in such a way that the removable device, after being moved by the pyrotechnic or explosive charge will stay sufficiently far away from its initial position to no longer force said two of the transfer units to move synchronously.

66. The fault tolerant actuator system of claim 64, further including a stopper or catch-up device for stopping the movement of the removable device in such a way that the removable device will not damage parts of the load and in such a way that the removable device, after being moved by the pyrotechnic or explosive charge will stay sufficiently far away from its initial position to no longer force said two of the transfer units to move synchronously.

67. The fault tolerant actuator system of claim 65 or 66, wherein the stopper or catch-up device includes an air-cushion device.

68. The fault tolerant actuator system of claim 65 or 66, wherein the stopper or catch-up device includes a plastically deformable device.

69. The fault tolerant actuator system of claim 65 or 66, wherein the stopper or catch-up device is arranged to stop the movement of the removable device in such a way that the removable device will not damage parts of the fault tolerant actuator system or of the load.

70. The fault tolerant actuator system of claim 62, further including a device for ensuring that none of the primary actuator and said two of the transfer units, after a movement of the release device, will obstruct the load to move within its normal range of movements.

71. The fault tolerant actuator system of claim 62, wherein the release device includes an electric motor and a mechanical transmission including a gear box for moving the release device.

72. The fault tolerant actuator system of claim 62, wherein the release device includes and electric motor and a mechanical transmission including a reduction drive for moving the release device.

73. The fault tolerant actuator system of claim 62, wherein the release device includes an electric motor and a mechanical transmission including a belt drive for moving the release device.

74. The fault tolerant actuator system of claim 62, wherein the release device includes an electric motor and a mechanical transmission including a screw drive for moving the release device.

75. The fault tolerant actuator system of claim 62, wherein the release device includes an electric motor and a mechanical transmission including a rack and pinion device for moving the release device.

76. A fault tolerant actuator system for moving a load in relation to a carrying structure including:
   at least two transfer units mounted between the carrying structure and the load,
   at least one pair of removable devices for joining the at least two transfer units to each other and/or for locking the at least two transfer units to take a fixed position in relation to each other, and
   a pyrotechnical or explosive charge arranged to move, when ignited or detonated, the at least one pair of removable devices from the position joining the at least two transfer units or locking the at least two transfer units in a fixed position to another position not joining the at least two transfer units or locking the at least two transfer units to take a fixed position in relation to each other,
   the removable devices of said at least one pair moving, during the moving when the pyrotechnical or explosive charge is ignited or detonated, in a substantially symmetric way away from each other, this symmetric way of moving reducing reaction forces transferred from the pyrotechnical or explosive charge, when ignited or detonated, to the carrying system and to the load.

77. The fault tolerant actuator system of claim 76, wherein the removable devices of said at least one pair are arranged to move, during the moving by the pyrotechnical or explosive charge when ignited or detonated, in substantially opposite directions.

* * * * *